United States Patent
Kono et al.

[19]

[11] Patent Number: 5,991,680
[45] Date of Patent: *Nov. 23, 1999

[54] CONTROL APPARATUS, CLUTCH SLIP CONTROL APPARATUS, AND METHODS OF MANUFACTURING THESE APPARATUSES

[75] Inventors: Katsumi Kono; Yasushi Kobiki, both of Toyota; Masataka Osawa; Ryoichi Hibino, both of Nagoya, all of Japan

[73] Assignees: Toyota Jidosha Kabushiki Kaisha, Toyota; Kabushiki Kaisha Toyota Chuo Kenkyusho, Aichi-ken, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/658,627

[22] Filed: Jun. 5, 1996

[30] Foreign Application Priority Data

Jun. 5, 1995 [JP] Japan .................................. 7-162813

[51] Int. Cl.$^6$ .............................. G06F 7/70; G06F 19/00
[52] U.S. Cl. .................................. 701/67; 701/68; 701/99; 477/169; 192/3.31
[58] Field of Search ............................ 364/424.096, 148, 364/149, 150, 151, 148.01, 176, 165, 155, 157; 477/98, 169, 174, 175, 176, 86, 181, 65; 192/3.31, 3.3; 180/197; 701/67, 68, 99

[56] References Cited

U.S. PATENT DOCUMENTS

| | | | |
|---|---|---|---|
| 4,582,185 | 4/1986 | Grimes et al. ........................... | 192/3.3 |
| 4,634,946 | 1/1987 | Moulds, III et al. .................... | 364/150 |
| 4,639,853 | 1/1987 | Rake et al. .............................. | 364/149 |
| 4,706,790 | 11/1987 | Lockhart et al. ........................ | 192/3.3 |
| 5,036,814 | 8/1991 | Osawa et al. ........................... | 123/352 |
| 5,121,820 | 6/1992 | Brown et al. ........................... | 192/3.3 |
| 5,202,833 | 4/1993 | Fodale .................................... | 192/3.58 |
| 5,275,267 | 1/1994 | Slicker .................................... | 192/0.033 |
| 5,322,150 | 6/1994 | Schmidt-Brucken et al. .......... | 477/176 |
| 5,404,289 | 4/1995 | Hang et al. ............................. | 364/148 |

(List continued on next page.)

FOREIGN PATENT DOCUMENTS

| | | |
|---|---|---|
| 61-52427 | 3/1986 | Japan . |
| 63-67461 | 3/1988 | Japan . |
| 1-30966 | 2/1989 | Japan . |
| 2-180365 | 7/1990 | Japan . |

OTHER PUBLICATIONS

John C. Doyle, et al., "Uncertainty and Robustness", Feedback Control Theory, 1992, pp. 46–49.

*Primary Examiner*—Jacques H. Louis-Jacques
*Attorney, Agent, or Firm*—Oblon, Spivak, McClelland, Maier & Neustadt, P.C.

[57] ABSTRACT

A control apparatus of the present invention can realize stable and good follow-up slip control of a plant, such as a lock-up clutch, irrespective of a characteristic perturbation of the plant, for example, deterioration of frictional members or operating oil of the clutch. The apparatus of the present invention also has an improved convergence of transient response. The control apparatus approximates a characteristic perturbation by a high-order function in a frequency domain and gives requisites for the stable and good follow-up control as a sensitivity function S and a complementary sensitivity function T of a feedback control system. Design of the feedback control system is considered as an issue of mixed sensitivity of H∞ control. A controller is accordingly designed with a function of predetermined order, which is substantially equal to the order of the high-order function approximating the characteristic perturbation. Design of the controller also reflects the result of evaluation of the complementary sensitivity function T. When the complementary sensitivity function T has a peak in a certain frequency domain, a predetermined increment is added to a weighting function W2 in the frequency domain. The plant input, for example, the slip revolution speed of the clutch, is controlled with the controller thus designed.

20 Claims, 29 Drawing Sheets

U.S. PATENT DOCUMENTS

| | | | |
|---|---|---|---|
| 5,406,474 | 4/1995 | Hanson | 364/148 |
| 5,474,506 | 12/1995 | Palansky et al. | 477/63 |
| 5,480,363 | 1/1996 | Matsubara et al. | 477/63 |
| 5,519,605 | 5/1996 | Cawlfield | 364/151 |
| 5,527,233 | 6/1996 | Tabata et al. | 477/62 |
| 5,527,238 | 6/1996 | Hrovat et al. | 477/166 |
| 5,569,117 | 10/1996 | Kono et al. | 477/169 |
| 5,588,937 | 12/1996 | Kono et al. | 477/169 |
| 5,611,750 | 3/1997 | Kono et al. | 477/65 |
| 5,613,583 | 3/1997 | Kono et al. | 192/3.31 |
| 5,620,390 | 4/1997 | Kono et al. | 477/65 |
| 5,626,535 | 5/1997 | Kono et al. | 477/169 |
| 5,626,536 | 5/1997 | Kono et al. | 477/181 |
| 5,627,750 | 5/1997 | Kono et al. | 364/424.096 |
| 5,643,136 | 7/1997 | Kono et al. | 477/169 |

Fig. 22

| | | | | | |
|---|---|---|---|---|---|
| SLIP SPEED (rpm) | 50~100 | 110~150 | 160~200 | 200~240 |
| ENGINE LOADING (L/Rev) | 0.4 | 0.6 | 0.8 | 1.000 |
| REVOLVING SPEED OF TURBINE (rpm) | 1000 | $<N_{12}$ | $<N_{13}$ | $<2400$ |
| TEMPERATURE OF OPERATING OIL (°C) | MEDIUM | LOW | HIGH | |
| CHANGE OVER TIME | NEW VEHICLE | | VEHICLE USED TO THE GUARANTEED MAXIMUM LIMIT | |
| SCATTERING OF INDIVIDUAL VEHICLES | VEHICLES OF IDENTICAL SPECIFICATION ARE USED. | | | |

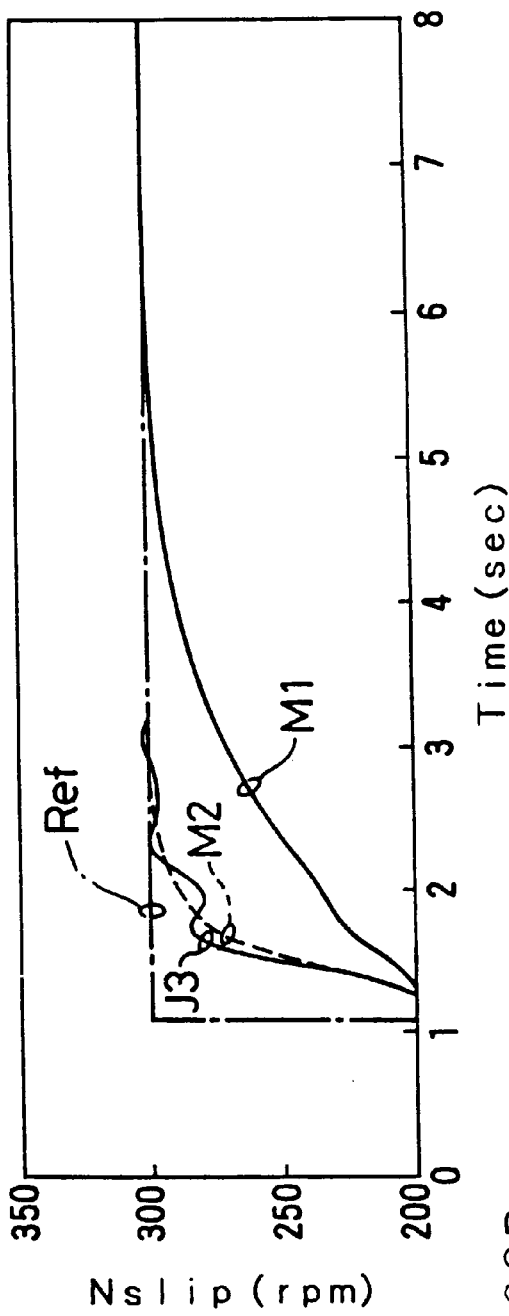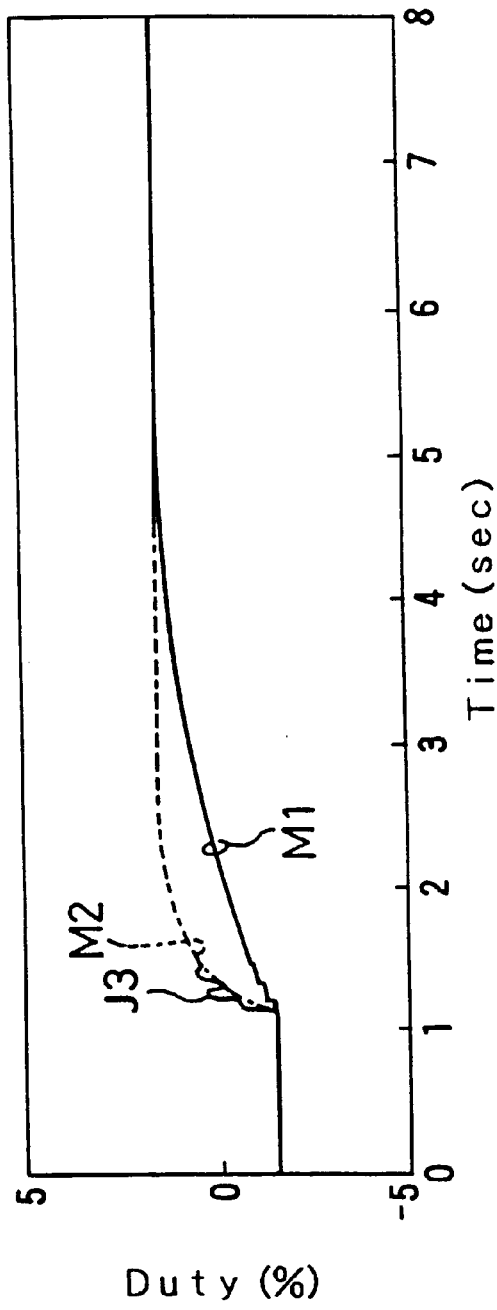
Fig. 29A
Fig. 29B

CONTROL APPARATUS, CLUTCH SLIP CONTROL APPARATUS, AND METHODS OF MANUFACTURING THESE APPARATUSES

BACKGROUND OF THE INVENTION

1. Field of the Invention

The present invention relates to a control apparatus and a method of manufacturing the inventive control apparatus, as well as to a clutch slip control apparatus as one typical application of the inventive control apparatus and a method of manufacturing the clutch slip control apparatus. More specifically, the present invention pertains to a control apparatus for outputting a plant input to make the actual state of a general plant coincide with a target state, thereby controlling the actual state of the plant. A concrete technique applied to a clutch slip control apparatus given as one aspect of such a control apparatus outputs a plant input of clutch operation to make an actual slip revolution speed coincide with a target slip revolution speed and adjusts a slip condition based on the plant input thus output.

2. Description of the Related Art

With the advance of control theories, control apparatuses of various types have been designed and manufactured. By way of example, a clutch slip control apparatus is explained herein. Known clutch slip control apparatuses include those for controlling a slip condition of a lock-up clutch of a torque converter. Such slip control apparatuses are designed to solve contradictory problems; that is, coupling inputs with outputs of a torque converter transmits vibrations of an engine directly to a transmission in a range of low engine speed, thus worsening the ride, whereas disconnecting outputs from inputs in a wide range of engine speed does not realize effective reduction of the fuel consumption rate.

Improvement has been given to these slip control apparatuses with a view to reconciling a quick response and stable control. One example of proposed improvement includes a process of calculating a current plant input from a deviation of the actual slip revolution speed from a target slip revolution speed as well as from a differential and an integral of the deviation or from a target slip revolution speed as well as from a differential and a second differential of the deviation (see JP-B-2-586). Another example includes a process of expanding these quantities in times series to derive an increase in plant input (see JP-A-64-30966). Sufficient matching of the characteristics of the control apparatus with those of a plant enables the slip quantity to be stably adjusted to and kept at a level substantially equal to or proximate to a target value, thereby realizing the high follow-up ability over the target value without lowering the stability.

These control apparatuses, however, still have a drawback; that is, insufficient control over a characteristic perturbation in a system for controlling a clutch slip condition. When there is a significant difference in properties between individual lock-up clutches or individual slip-regulating hydraulic control systems, or when the frictional characteristics of the lock-up clutch or $\mu$-v characteristics of the clutch are varied from the initial designed conditions, due to deterioration of frictional members or operating oil, to damage the stability of the slip revolution speed, the conventional control apparatuses can not realize the stable, high-speed control of the slip quantity to be substantially equal to or proximate to the target value. This issue will be described concretely with the drawings of FIGS. 36 through 38.

Characteristic perturbations in a slip control system are shown as variations in gain and phase of a transfer function from a plant input to a slip revolution speed. FIG. 36 is a graph showing a difference in designed properties between individual clutches. The characteristics of clutches are varied depending upon the instability or pressing orientation of frictional members, especially in a high frequency domain. When frictional members are worn or operating oil deteriorates thermally over time, both the gain and phase characteristics lower from the initial designed conditions in medium and high frequency domains as shown in FIGS. 37A and 37B. Such deterioration may cause the frictional characteristics to have a resonance peak in a high frequency domain as illustrated in FIG. 38. Under these conditions, the frictional members may show a so-called stick-slip behavior (repeating a series of movements, i.e., contact, revolution, and separation) and thereby cause a self-oscillation of several tens hertz. This results in totally damaging the control stability of the slip revolution speed.

The problem discussed above may be ascribed to the conventional design policies of control apparatuses. The prior art control apparatuses are designed to satisfy the stability and follow-up properties of control only under a specific condition, that is, on the assumption that control characteristics of a clutch are not significantly varied. Possible improvement applicable to the control apparatus, which calculates a current plant input from a deviation of the actual slip revolution speed from a target slip revolution speed as well as from differential and second differential of the deviation, is to change the constants of control according to the characteristic perturbations of the control system. Such improvement is, however, not practical since it makes the structure of the control system undesirably complicated while not ensuring the stability of the change-over algorithm.

The issue of characteristic perturbations always exists in real systems. In order to guarantee the stability of control, known control apparatuses generally have only a slow response. Although the slow-response control stably keeps the actual slip revolution speed substantially equal to or proximate to a target slip revolution speed under a stationary driving condition, it can not block an input torque variation of an engine or enhance the efficiency of torque transmission following a transient driving condition, in which the target slip revolution speed varies.

SUMMARY OF THE INVENTION

The object of the present invention is thus to provide an improved control apparatus, which realizes stable control with a quick response even when a characteristic perturbation occurs in a plant. A clutch slip control apparatus is given as one preferable application of such an inventive control apparatus. The present invention further relates to a method of manufacturing the inventive control apparatus as well as to a method of manufacturing the clutch slip control apparatus.

The above and other related objects are realized by a control apparatus of the present invention comprising detection means for measuring an actual state of a plant. The control apparatus of the invention determines a plant input used for controlling the plant to make the actual state of the plant coincide with a target state and adjusts the actual state of the plant based on the plant input. The inventive control apparatus further includes memory means for storing a given constant, which is determined with a high-order function approximating to a variation in input-output frequency characteristics of the plant input and the actual state to satisfy required response and stability in a feedback control system for controlling the actual state of the plant, the given constant being corrected to include a predetermined increment in a preset frequency domain, in which a complementary sensitivity function set for the plant has a peak. The inventive control apparatus also includes: first calculation means for deriving a first parameter using the given constant stored in the memory means, the first parameter discretely reflecting past data of the plant input, which have been obtained in a current feedback control cycle and in previous cycles executed one to a preset number of times before; and second calculation means for deriving a second parameter using the given constant stored in the memory means, the second parameter discretely reflecting past data of a deviation of the actual state from the target state, which have been obtained in a current feedback control cycle and in previous cycles executed one to a preset number of times before. The inventive control apparatus further includes plant input determination means for determining a next plant input based on the first parameter and the second parameter respectively calculated by the first calculation means and the second calculation means.

In the inventive control apparatus thus constructed, the constant stored in the memory means is set to satisfy required response and stability in a feedback control system for controlling the actual state of the plant. The constant is corrected to include a predetermined increment in a preset frequency domain, in which a complementary sensitivity function given for the plant has a peak. A high-order function, which approximates to a variation in input-output frequency characteristics of the plant input $u(k)$ and the actual state, is preferably used for setting the constant. The first calculation means derives a first parameter A using the given constant stored in the memory means. The first parameter A discretely reflects past data of the plant input $u(k-1), \ldots u(k-n)$, which have been obtained in a current feedback control cycle and in previous cycles executed one to a preset number (n) of times before. The second calculation means derives a second parameter B using the given constant stored in the memory means. The second parameter B discretely reflects past data of a deviation $e(k), \ldots e(k-m)$ of the actual state of the plant measured by the detection means from the target state, which have been obtained in a current feedback control cycle and in previous cycles executed one to a preset number (m) of times before. The plant input determination means determines a next plant input $u(k)$ based on the first parameter A and the second parameter B thus obtained. The inventive control apparatus makes the actual state of the plant coincide with the target state with the plant input $u(k)$.

As is apparent from the foregoing, the control apparatus of the invention calculates both the first parameter A and the second parameter B with a given constant, which is determined with a high-order function approximating to a variation in input-output frequency characteristics of the plant input $u(k)$ and the actual state to satisfy required response and stability in a feedback control system for controlling the actual state of the plant and corrected to include a predetermined increment in a specific frequency domain, in which a complementary sensitivity function set for the plant has a peak. This structure attains stable control with a quick response over a characteristic perturbation. Even when the complementary sensitivity function has a peak, the structure of the invention can ensure sufficient stability (convergence) of control without lowering the response. The inventive apparatus can further improve the convergence of transient response.

In another aspect, the present invention is directed to a method of manufacturing a control apparatus for stably controlling a plant, which is expected to have a characteristic perturbation. The inventive method includes the step of designing characteristics of a weighting function to satisfy a complementary relationship between a sensitivity function and a complementary sensitivity function. In accordance with this aspect, the method further includes the step of, when the complementary sensitivity function set for the plant has a peak in a preset frequency domain, adding a predetermined increment to the weighting function in a region corresponding to the preset frequency domain.

The inventive method attains the required performance of control without repeating a time-consuming matching process or cut and error. The method can effectively cancel fluctuations of transient response, which may occur under a variety of operating conditions, simply by evaluating a complementary sensitivity function. When the problem of transient response arises at a plurality of operating points with different operating conditions, the prior art controller, which depends upon the matching procedure, trial and error, or experience, can not give any effective solution. The inventive method, on the other hand, can regularly solve this problem, thereby reducing the steps of design and adjustment and significantly saving the time and labor required for development.

The control apparatus of the invention may be applicable to control a slip condition of a clutch. In still another aspect, the present invention relates to a slip control apparatus comprising slip revolution speed detection means for measuring an actual slip revolution speed of a clutch. The slip control apparatus of the invention determines plant input supplied to the clutch to make the actual slip revolution speed of the clutch coincide with a target slip revolution speed and adjusts a slip condition of the clutch based on the plant input. The inventive slip control apparatus further includes memory means for storing a given constant, which is determined with a high-order function approximating to a perturbation of input-output frequency characteristics between the plant input and the actual slip revolution speed to satisfy required response and stability in a feedback control system for controlling the slip condition of the clutch, the given constant being corrected to include a predetermined increment in a preset frequency domain, in which a complementary sensitivity function set for the feedback control system has a peak. In accordance with this aspect, the inventive slip control apparatus also includes: first calculation means for deriving a first parameter using the given constant stored in the memory means, the first parameter discretely reflecting past data of the plant input, which have been obtained in a current feedback control cycle and in previous cycles executed one to a preset number of times before; and second calculation means for deriving a second parameter using the given constant stored in the memory means, the second parameter discretely reflecting past data of a deviation of the actual slip revolution speed from the target slip revolution speed, which have been obtained in a current feedback control cycle and in previous cycles executed one to a preset number of times before. The slip control apparatus further includes plant input determination means for determining a next plant input based on the first parameter and the second parameter respectively calculated by the first calculation means and the second calculation means.

The slip control apparatus of the present invention ensures sufficient stability and follow-up property (response) over a characteristic perturbation in a slip-controlled clutch. When a transient response of slip control has fluctuations under a specific operating condition, the inventive slip control apparatus evaluates a complementary sensitivity function and adds a predetermined increment to a weighting function in a certain frequency domain, in which the complementary sensitivity function has a peak, thereby further improving the convergence of transient response. This slip control apparatus can preferably be applied to slip control of a clutch, which transmits revolutions of an internal combustion engine to an automatic transmission. The inventive structure prevents a variation in torque from being transmitted from the internal combustion engine and enhances the transmission efficiency of torque in a stationary condition as well as in a transient driving condition or even in a condition with characteristics varied over time, thereby improving the fuel consumption. As mentioned previously, the prior art control apparatus has a slow response in order to guarantee the stability of control and can make the slip state approach a target state only when a stationary driving condition continues for a sufficiently long time. The inventive clutch control apparatus, which can reconcile a quick response and stable control, is remarkably advantageous over the prior art structure. The inventive clutch control apparatus can further improve the convergence of transient response in slip control of a clutch under a variety of driving conditions.

In the slip control apparatus of the invention, the constant stored in the memory means is set to satisfy required response and stability in a feedback control system for controlling the slip condition of the clutch CL. The constant is corrected to include a predetermined increment in a preset frequency domain, in which a complementary sensitivity function set for the feedback control system has a peak. A high-order function, which approximates to a perturbation of input-output frequency characteristics between the plant input u(k) and the actual slip revolution speed Ns1, is preferably used for setting the constant. The first calculation means derives a first parameter A using the given constant stored in the memory means. The first parameter A discretely reflects past data of the plant input u(k−1), . . . u(k−n), which have been obtained in a current feedback control cycle and in previous cycles executed one to a preset number (n) of times before. The second calculation means derives a second parameter B using the given constant stored in the memory means. The second parameter B discretely reflects past data of a deviation e(k), . . . e(k−m) of the actual slip revolution speed Ns1 of the clutch CL measured by the detection means from the target slip revolution speed N*, which have been obtained in a current feedback control cycle and in previous cycles executed one to a preset number (m) of times before. The plant input determination means determines a next plant input u(k) based on the first parameter A and the second parameter B thus obtained. The inventive slip control apparatus makes the actual slip revolution speed Ns1 coincide with the target slip revolution speed N* with the plant input u(k).

As is apparent from the foregoing, the slip control apparatus of the invention calculates both the first parameter A and the second parameter B with a given constant, which is determined with a high-order function approximating to a variation in input-output frequency characteristics of the plant input u(k) and the actual slip revolution speed Ns1 to satisfy required response and stability in a feedback control system for controlling the slip condition and corrected to include a predetermined increment in a specific frequency domain, in which a complementary sensitivity function set for the plant has a peak.

By considering analyses of characteristic perturbations in a real control system, it is preferable that the first calculation means and the second calculation means respectively derive the first parameter A and the second parameter B reflecting at least five pieces of past data. Although the preset number (n) which the first calculation means discretely goes back is theoretically identical with the preset number (m) which the second calculation means discretely goes back, these preset numbers may be different from each other.

In still another aspect, the present invention relates to a method of manufacturing a slip control apparatus, the slip control apparatus output plant input to a clutch to make an actual slip revolution speed of the clutch coincide with a target slip revolution speed and adjust a slip condition of the clutch based on the output plant input. The inventive method further comprises the steps of: measuring characteristic perturbations in a feedback control system for controlling the slip condition of the clutch according to a plurality of factors causing the characteristic perturbations; approximating a comprehensive characteristic of the characteristic perturbations measured according to the plurality of factors by a first high-order weighting function; evaluating a complementary sensitivity function and a sensitivity function as requisites for making the feedback control system stable with respect to the characteristic perturbations, the complementary sensitivity function being determined by taking into account the first weighting function and a first transfer function from the target slip revolution speed to the actual slip revolution speed, the sensitivity function being determined by taking into account a second transfer function from the target slip revolution speed to a deviation of control and a second weighting function set for ensuring a quick response; adding a predetermined increment to the first weighting function in a preset frequency domain, in which the complementary sensitivity function has a peak, prior to the evaluation; and determining a constant used for deriving a control quantity of the feedback control system, based on the evaluation.

In the inventive method of manufacturing a slip control apparatus, at a first step, characteristic perturbations in a feedback control system for controlling the slip condition of the clutch is measured according to a plurality of factors causing the characteristic perturbations. At a next step, a comprehensive characteristic of the characteristic perturbations measured according to the plurality of factors is approximated by a first high-order weighting function W2. A first specific quantity and a second specific quantity are evaluated as requisites for making the feedback control system stable with respect to the characteristic perturbations. The first specific quantity is determined by taking into account the first weighting function W2 and a first transfer function from the target slip revolution speed N* to the actual slip revolution speed Ns1, whereas the second specific quantity is determined by taking into account a second transfer function from the target slip revolution speed N* to a deviation of control and a second weighting function W1 set for ensuring a quick response. A predetermined increment is added to the first weighting function W2 in a preset frequency domain, in which the complementary sensitivity function of the feedback control system has a peak, prior to the evaluation. A constant used for deriving a control quantity of the feedback control system is determined, based on the evaluation.

In yet another aspect, the present invention is directed to a method of manufacturing a slip control apparatus, the slip control apparatus output plant input to a clutch to make an actual slip revolution speed of the clutch coincide with a target slip revolution speed and adjust a slip condition of the clutch based on the output plant input. In accordance with this aspect, the inventive method further comprises the steps of: measuring characteristic perturbations in a feedback control system for controlling the slip condition of the clutch according to a plurality of factors causing the characteristic perturbations; approximating a comprehensive characteristic of the characteristic perturbations measured according to the plurality of factors by a first high-order weighting function; evaluating a complementary sensitivity function, a sensitivity function, and a specific quantity as requisites for making the feedback control system stable with respect to the characteristic perturbations, the complementary sensitivity function being determined by taking into account the first weighting function and a first transfer function from the target slip revolution speed to the actual slip revolution speed, the sensitivity function being determined by taking into account a second transfer function from the target slip revolution speed to a deviation of control and a second weighting function set for ensuring a quick response, the specific quantity being determined by taking into account a third transfer function from a torque disturbance, which represents a variation in torque applied to the feedback control system, to the actual slip revolution speed, an amount representing the first weighting function, the second weighing function set for ensuring a quick response, and the second transfer function from the target slip revolution speed to a deviation of control; adding a predetermined increment to the first weighting function in a preset frequency domain, in which the complementary sensitivity function has a peak, prior to the evaluation; and determining a constant used for deriving a control quantity of the feedback control system, based on the evaluation.

In this inventive method, in addition to the above first and second specific quantities, a third specific quantity is evaluated. The third specific quantity is determined by taking into account a third transfer function from a torque disturbance, which represents a variation in torque applied to the feedback control system, to the actual slip revolution speed Ns1, an amount representing the first weighting function W2, the second weighing function W1, and the second transfer function from the target slip revolution speed N* to a deviation of control.

The slip control apparatus manufactured by this inventive method outputs the plant input u(k) and controls the slip condition to make the actual slip revolution speed Ns1 coincident with the target slip revolution speed N*. The control of slip condition (making the actual slip revolution speed Ns1 coincident with the target slip revolution speed N*) is implemented against a torque disturbance, which results in varying the slip speed. Even when the complementary sensitivity function has a peak, the slip control apparatus can maintain the preferable stability or convergence of the feedback control system while restricting a drop of response to a minimal level.

The inventive method discussed above attains the required performance of control without repeating a time-consuming matching process or cut and error. The method can effectively cancel fluctuations of transient response, which may occur under a variety of operating conditions, simply by evaluating a complementary sensitivity function, thereby reducing the steps of design and adjustment and significantly saving the time and labor required for development.

These and other objects, features, aspects, and advantages of the present invention will become more apparent from the following detailed description of the preferred embodiments with the accompanying drawings.

BRIEF DESCRIPTION OF THE DRAWINGS

FIG. 22 shows ranges of operating conditions used for identifying the characteristics of the system;

FIGS. 29A and 29B show characteristics of transient response in the first embodiment;

DESCRIPTION OF THE PREFERRED EMBODIMENT

Figure 3:
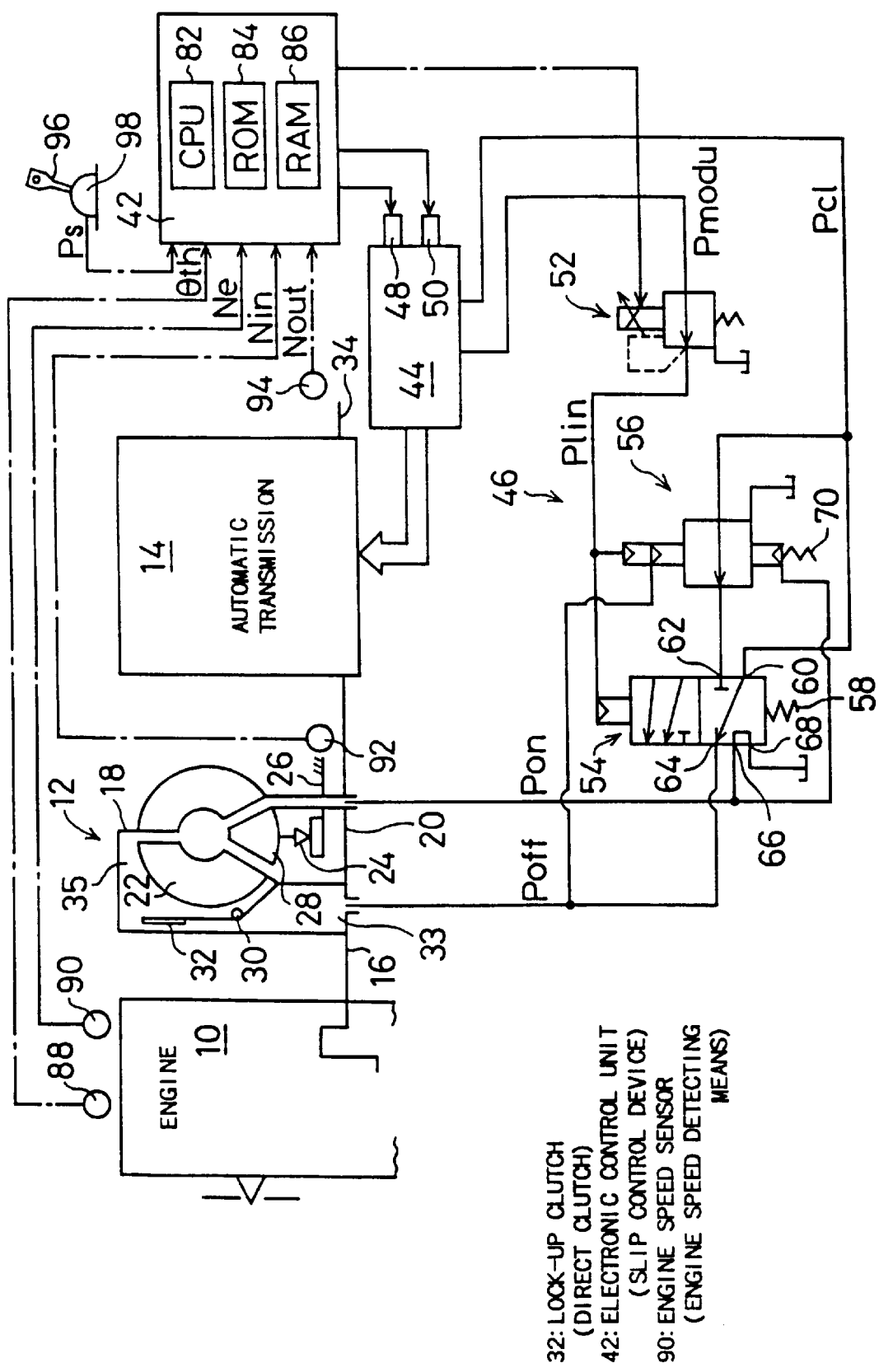
FIG. 3 schematically shows a power transmission system mounted on a vehicle and having a slip control apparatus of a lock-up clutch embodying the present invention incorporated therein.

Referring now to FIG. 3, there is shown a hardware structure of the slip control apparatus of the first embodiment. As shown in FIG. 3, power of an engine 10 is transmitted to driving wheels via a torque converter 12 with a lock-up clutch, a stepped automatic transmission 14 including three sets of planetary gear units, and a differential gear unit (not shown).

The torque converter 12 is fixed to a pump impeller 18 coupled to a crank shaft 16 of the engine 10 and to an input shaft 20 of the automatic transmission 14. The torque converter 12 is provided with a turbine runner 22 rotating with oil supplied from the pump impeller 18, a stator 28 fixed to a non-rotating housing element 26 via a one-way clutch 24, and a lock-up clutch 32 coupled with the input shaft 20 via a damper 30. The lock-up clutch 32 directly connects the input and output elements of the torque converter 12, that is, the crank shaft 16 and the input shaft 20, with each other. While the oil pressure in an engagement oil chamber 35 of the torque converter 12 is higher than the oil pressure in a release oil chamber 33, the lock-up clutch 32 is held in an engagement condition to transmit rotations of the crank shaft 16 directly to the input shaft 20. Upon condition that the oil pressure in the release oil chamber 33 of the torque converter 12 is higher than the oil pressure in the engagement oil chamber 35, on the contrary, the lock-up clutch 32 is held in a non-engagement condition to allow the torque converter 12 to implement its primary functions. Under the non-engagement condition, the torque converter 12 converts a torque at an amplification rate corresponding to an input/output rotating speed ratio and then transmits the converted torque of the crank shaft 16 to the input shaft 20.

The automatic transmission 14 having the input shaft 20 and an output shaft 34 is constructed as a stepped planetary gear unit wherein one of a plurality of forward gear steps and a reverse gear step is selected to be under an engagement condition according to a specific combination of operating conditions of a plurality of hydraulic frictional engagement units. The automatic transmission 14 includes a hydraulic change gear control circuit 44 for regulating gear steps of the automatic transmission 14 and a hydraulic engagement control circuit 46 for controlling engagement of the lock-up clutch 32. The hydraulic change gear control circuit 44 has a first solenoid-operated valve 48 and a second solenoid-operated valve 50, which are respectively operated on and off by a solenoid 48a and a solenoid 50a. The clutch and brake mechanism is selectively operated according to a combination of the operating conditions of the first solenoid-operated valve 48 and the second solenoid-operated valve 50 so as to realize one of a first gear speed through a fourth gear speed.

The hydraulic engagement control circuit 46 includes a linear solenoid valve 52, a change-over valve 54, and a slip control valve 56. The linear solenoid valve 52 has a fixed modulator pressure Pmodu generated in the hydraulic change gear control circuit 44 as an initial pressure and acts linearly in response to the current running through a linear solenoid 52a. The linear solenoid valve 52 continuously generates an output pressure Plin having the magnitude corresponding to the intensity of a driving current Isol from an electronic control unit (ECU) 42. The output pressure Plin is applied to the change-over valve 54 and the slip control valve 56. The change-over valve 54 is movable between a release position at which the lock-up clutch 32 is released and an engagement position at which the lock-up clutch 32 is engaged. Initial operating pressure of the slip control valve 56 is a regulator pressure Pcl generated in response to a throttle valve travel by a clutch pressure control valve (not shown) in the hydraulic change gear control circuit 44.

The change-over valve 54 includes a spring 58 for pressing a spool valve element (not shown) towards the release position, a first port 60 receiving the regulator pressure Pcl, a second port 62 receiving an output pressure of the slip control valve 56, a third port 64 connecting with the release oil chamber 33, a fourth port 66 connecting with the engagement oil chamber 35, and a fifth port 68 connecting with a drain pipe. When the output pressure Plin of the linear solenoid valve 52 applied onto the spool valve element of the change-over valve 54 becomes lower than a predetermined level, the spool valve element of the change-over valve 54 is moved to the release position illustrated in FIG. 3 by the pressing force of the spring 58. The shift of the change-over valve 54 to the release position results in blocking the second port 62 and connecting the first port 60 to the third port 64 as well as the fourth port 66 to the fifth port 68. This makes an oil pressure Poff in the release oil chamber 33 equal to the regulator pressure Pcl and an oil pressure Pon in the engagement oil chamber 35 equal to the atmospheric pressure, thereby releasing the lock-up clutch 32. At this moment, the torque converter 12 implements its primary functions to convert and transmit the torque.

When the output pressure Plin of the linear solenoid valve 52 applied on the spool valve element of the change-over valve 54 becomes higher than the predetermined level, on the other hand, the spool valve element of the change-over valve 54 is moved to the engagement position against the pressing force of the spring 58. The shift of the change-over valve 54 to the engagement position results in blocking the fifth port 68 and connecting the first port 60 to the fourth port 66 as well as the second port 62 to the third port 64. This makes the oil pressure Pon in the engagement oil chamber 35 equal to the regulator pressure Pcl and controls the oil pressure Poff in the release oil chamber 33 by means of the slip control valve 56, thereby slip controlling or engaging the lock-up clutch 32.

The slip control valve 56 is provided with a spring 70 for pressing a spool valve element (not shown) towards an increase in the output pressure. The oil pressure Pon in the engagement oil chamber 35 is applied onto the spool valve element of the slip control valve 56 to generate a driving force towards an increase in the output pressure whereas the oil pressure Poff in the release oil chamber 33 and the output pressure Plin of the linear solenoid valve 52 are applied onto the spool valve element of the slip control valve 56 to generate a driving force towards a decrease in the output pressure. The slip control valve 56 accordingly works to vary a pressure difference ΔP=Pon-Poff representing a slip amount, in response to the output pressure Plin of the linear solenoid valve 52 as expressed by:

$$\Delta P = Pon - Poff \quad (1)$$
$$= (A3 - A1)Plin - F/A1$$

where F, A1, A2 (=A1), and A3 respectively denote a pressing force of the spring 70, an area in the spool valve element which the oil pressure Pon is applied to, an area which the oil pressure Poff is applied to, an area which the output pressure Plin is applied to.

Figure 4:
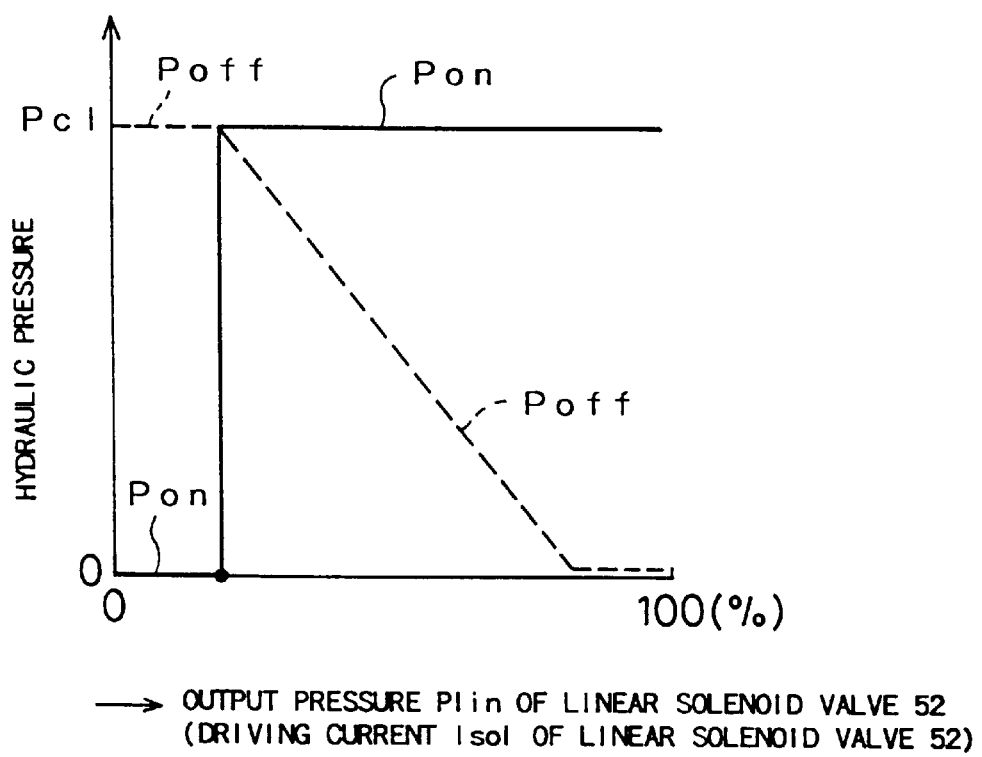
FIG. 4 is a graph showing the relationship between the driving current of the linear solenoid valve 52 and the oil pressure Pcl.

In the hydraulic engagement control circuit 46 constructed as above, both the oil pressure Pon in the engagement oil chamber 35 and the oil pressure Poff in the release oil chamber 33 vary with the output pressure Plin of the linear solenoid valve 52 as shown in the graph of FIG. 4. This means that the switching operation of the change-over valve 54 and the slip control of the lock-up clutch 32 after a shift of the change-over valve 54 to the engagement position are conducted in response to the output pressure Plin of the linear solenoid valve 52.

The electronic control unit 42 designed and constructed as below executes the processing required for the slip control. The electronic control unit 42 is constructed as a microcomputer consisting of a variety of known elements including a CPU 82, a ROM 84, a RAM 86, and an interface circuit (not shown). In this embodiment, the interface circuit of the electronic control unit 42 connects with a throttle sensor 88 for detecting a travel of a throttle valve disposed in an intake manifold of the engine 10, an engine speed sensor 90 for detecting the rotating speed of the engine 10, an input shaft speed sensor 92 for detecting the rotating speed of the input shaft 20 of the automatic transmission 14, an output shaft speed sensor 94 for detecting the rotating speed of the output shaft 34 of the automatic transmission 14, and a lever position sensor 98 for detecting the position of a gear shift lever 96, L (low), S (second), D (drive), N (neutral), R (reverse), and P (parking) ranges. The electronic control unit 42 receives data of a throttle valve travel θth, an engine speed Ne (rotating speed NP of the pump impeller 18), a rotating speed Nin of the input shaft 20 (rotating speed Nt of the turbine impeller), a rotating speed Nout of the output shaft 34, and a position Ps of the gear shift lever 96 output from the corresponding sensors 88, 90, 92, 94, and 98 via the interface circuit 85.

The CPU 82 of the electronic control unit 42 uses the RAM 86 as a work area, processes input signals according to a program previously stored in the ROM 84, and controls the first solenoid-operated valve 48, the second solenoid-operated valve 50, and the linear solenoid valve 52 to execute the change gear control of the automatic transmission 14 and the engagement and release of the lock-up clutch 32. Concrete process of the change gear control includes steps of selecting a change gear map corresponding to an actual change gear step out of a plurality of change gear maps previously stored in the ROM 84, referring to the selected change gear map to determine a change gear step based on a driving condition of the vehicle, for example, a vehicle speed SPD calculated from the throttle valve travel θth and the output shaft rotating speed Nout, and actuating the first solenoid-operated valve 48 and the second solenoid-operated valve 50 to realize the change gear step. The CPU 82 accordingly controls the clutch and braking mechanism of the automatic transmission 14 and selects one of the four forward gear steps to realize a desirable gear change.

Figure 5:
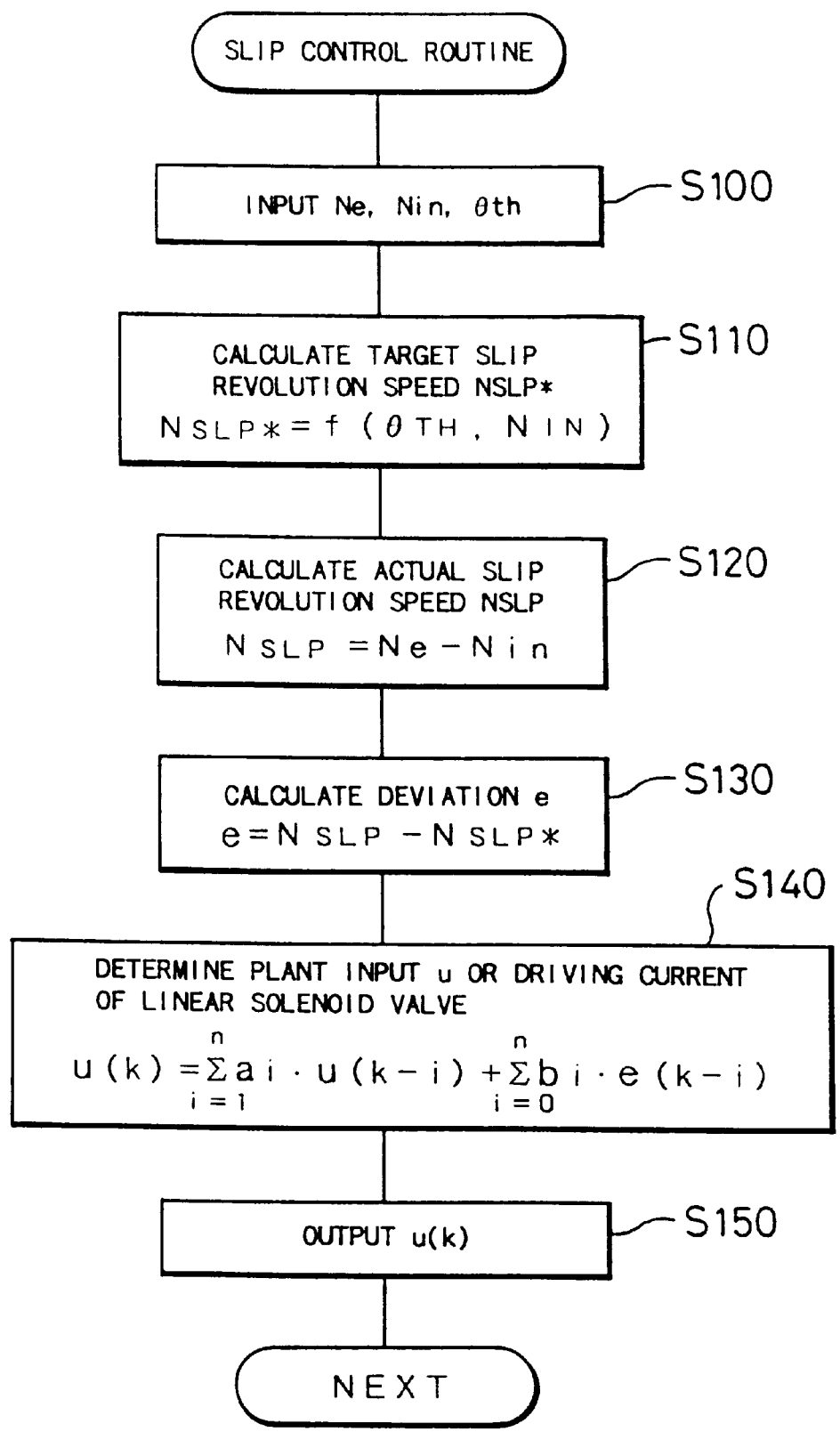
FIG. 5 is a flowchart showing a slip control routine executed in the first embodiment.

The processing steps shown in FIG. 5 are executed in the electronic control unit 42. FIG. 5 is a flowchart showing a slip control routine executed by the electronic control unit 42. The electronic control unit 42 repeatedly executes the slip control routine at intervals of several milliseconds when determining that the driving conditions of the vehicle are within a target area of slip control. The driving conditions used for the determination are generally the revolving speed Nout of the output shaft and the throttle valve travel θth as shown in FIG. 6.

Figure 6:
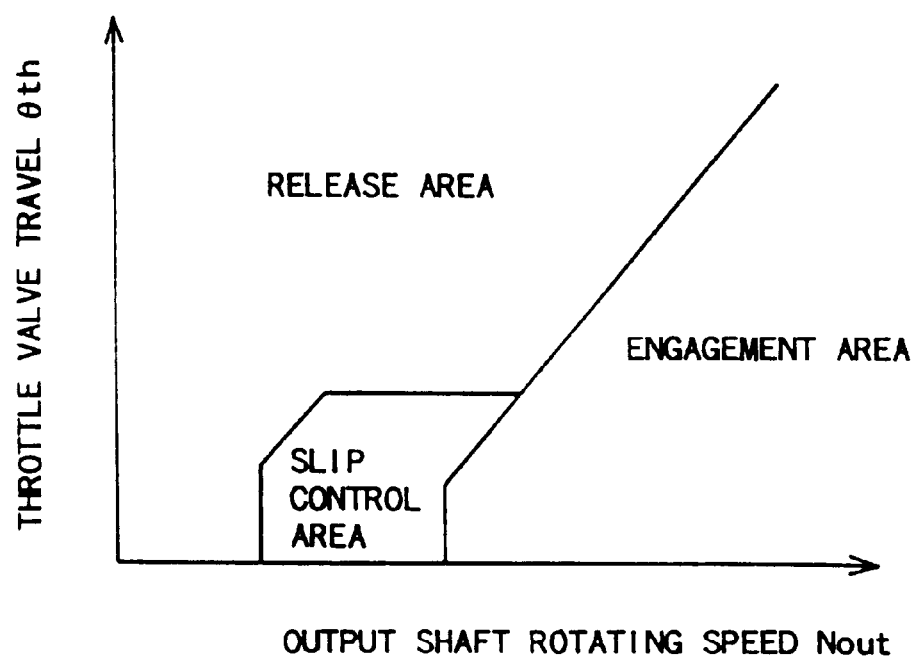
FIG. 6 is a graph showing a target area of slip control defined by a rotating speed Nout of an output shaft and a throttle valve travel θth in the first embodiment.

Upon condition that both the output shaft rotating speed Nout and the throttle valve travel θth are in the target domain of slip control shown in FIG. 6, the electronic control unit 42 starts the slip control routine of FIG. 5. At step S100, data of the engine speed Ne, the input shaft rotating speed Nin, the output shaft rotating speed Nout, the throttle valve travel θth, and the change gear step Ps are input via the interface circuit. At step S110, the electronic control unit 42 calculates a target slip revolution speed NSLP* from the input shaft rotating speed Nin, the throttle valve travel θth, and the change gear step Ps input at step S100. The target slip revolution speed NSLP* may be determined by referring to a three-dimensional map prepared and stored for each change gear step Ps to represent the relationship between the output shaft rotating speed Nout, the throttle valve travel θth, and the target slip revolution speed NSLP*.

Figure 7:
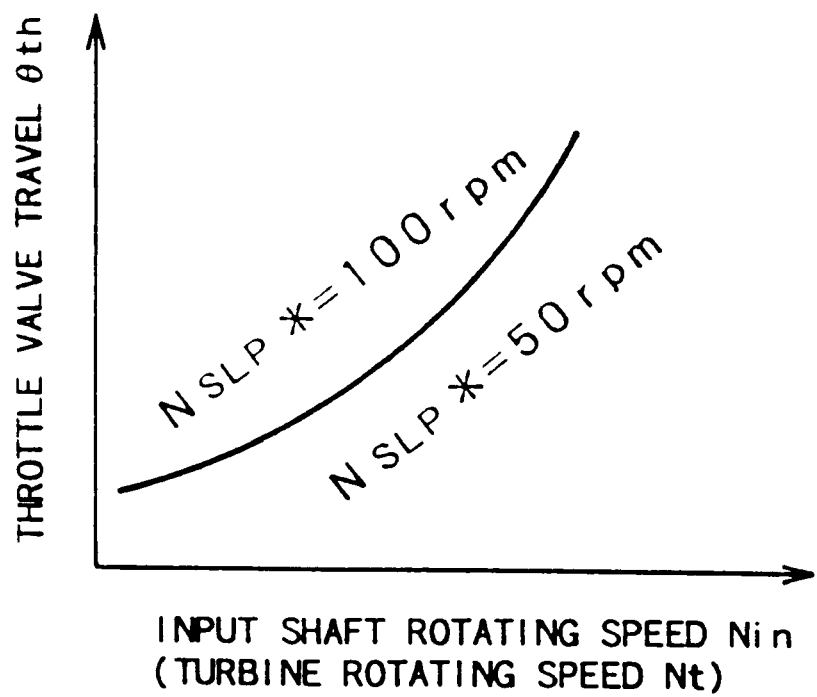
FIG. 7 is a graph used for determining a target slip revolution speed NSLP* in the target area of slip control.

FIG. 7 is an exemplified map applicable to determination of the target slip revolution speed NSLP* based on the input shaft rotating speed Nin and the throttle valve travel θth at a specified change gear position Ps. In this example, the target slip revolution speed NSLP* is determined to be either 50 rpm or 100 rpm according to the output shaft rotating speed Nout and the throttle valve travel θth. The process of determining the target slip revolution speed NSLP* corresponds to the target value setting unit. After the target slip revolution speed NSLP* is determined at step S110, the program proceeds to step S120 at which an actual slip revolution speed NSLP of the torque converter 12 is calculated as a difference between the engine speed Ne and the input shaft rotating speed Nin. At step S130, a deviation e is determined by subtracting the target slip revolution speed NSLP* from the actual slip revolution speed NSLP.

Although the number of times of repeating the slip control routine is not mentioned above, the routine repeated at intervals of several milliseconds or several tens milliseconds is a discrete process to make the times of repetition distinguishable. The electronic control unit 42 stores in the RAM 86 data of the deviation e and a plant input u corresponding to a driving current actually running through the linear solenoid valve 52, which are obtained in the current cycle through in the cycle executed i times before. At step S140, the electronic control unit 42 calculates the plant input u corresponding to the driving current of the linear solenoid valve 52 by the equation given below:

$$u(k) = \sum_{i=1}^{n} ai \cdot u(k-i) + \sum_{i=0}^{n} bi \cdot e(k-i) \quad (2)$$

As expressed by Equation 2, a next plant input u(k) is determined as a total of summation of past plant inputs u(k−i) multiplied by a first controller coefficient ai and summation of past deviations e(k−i) multiplied by a second controller coefficient bi. The past plant inputs u(k−i) and the past deviations e(k−i) are obtained in the previous cycle through in the cycle executed n times before, and in the current cycle through in the cycle executed n times before, respectively. Although H∞ control is applied to calculate the plant input u(k) in accordance with Equation 2 in this embodiment, H∞ control is not essential to the principle of the invention and the conventional PID control may also be applicable. Details of the H∞ control including the determination of the coefficients ai and bi will be described later. The program proceeds to step S150 to output the modified plant input u(k)' to the linear solenoid valve 52 via the interface circuit and goes to NEXT to exit from the routine.

Figure 8:
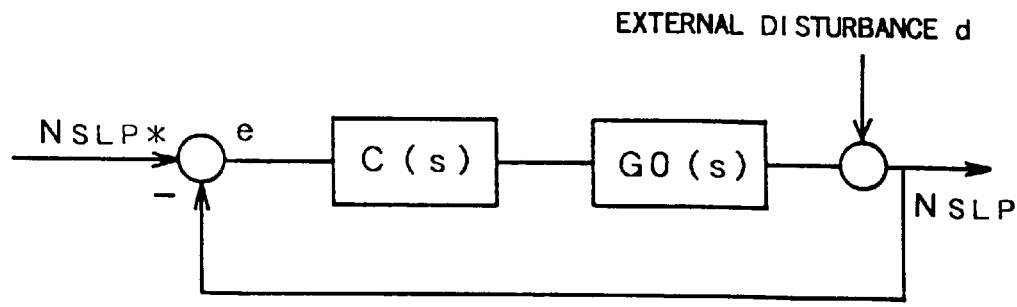
FIG. 8 is a block diagram illustrating a control system before a characteristic perturbation with a transfer function.
Figure 9:
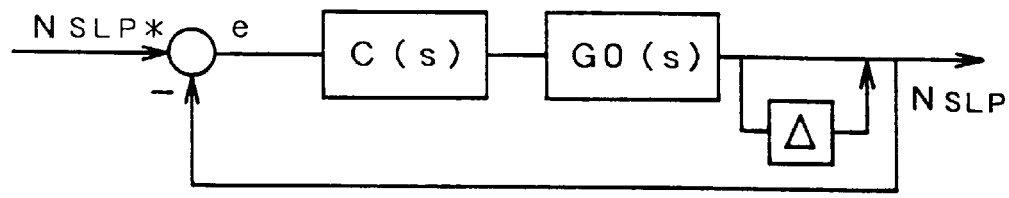
FIG. 9 is a block diagram illustrating the control system after the characteristic perturbation with a transfer function.

Specific design for determining the first controller coefficient ai and the second controller coefficient bi used at step S140 in the flowchart of FIG. 5 is described in detail. Design framework in a single input-output system is described prior to the concrete design process. A closed loop system shown in FIG. 8 is assumed here as a slip revolution speed control system. In the following description, NSLP*, e, C(s), G0(s) respectively denote a target slip revolution speed, a deviation of an actual slip revolution speed NSLP from the target slip revolution speed NSLP*, a transfer function of the control system (hereinafter may be referred to as the controller), and a transfer function of a plant (object to be controlled). Assume that a characteristic perturbation Δ(s) occurs in the control system as shown in FIG. 9. The characteristic perturbation is ascribed to various factors such as deterioration of a frictional member. A plant transfer function G(s) after the characteristic perturbation is expressed as a multiplicative perturbation from the initial designed characteristics, which is given by:

$$G(s) = \{I + \Delta(s)\} G0(s) \quad (3)$$

wherein I represents a unit matrix.

Stability under the condition of generating the characteristic perturbation Δ(s) is expressed by the Small Gain theorem based on Generalized Nyquist Stability Theorem. The Small Gain theorem gives a condition for stabilizing the whole closed loop system when the controller transfer function C(s) and the plant transfer function G0(s) are respectively stable. When a transfer function of the open loop system is expressed as $$L(s) = G0(s)C(s),$$

the condition is given by:

$$\|L(s)\|_\infty = \max_\omega |L(j\omega)| < 1 \quad (4)$$

Figure 10:
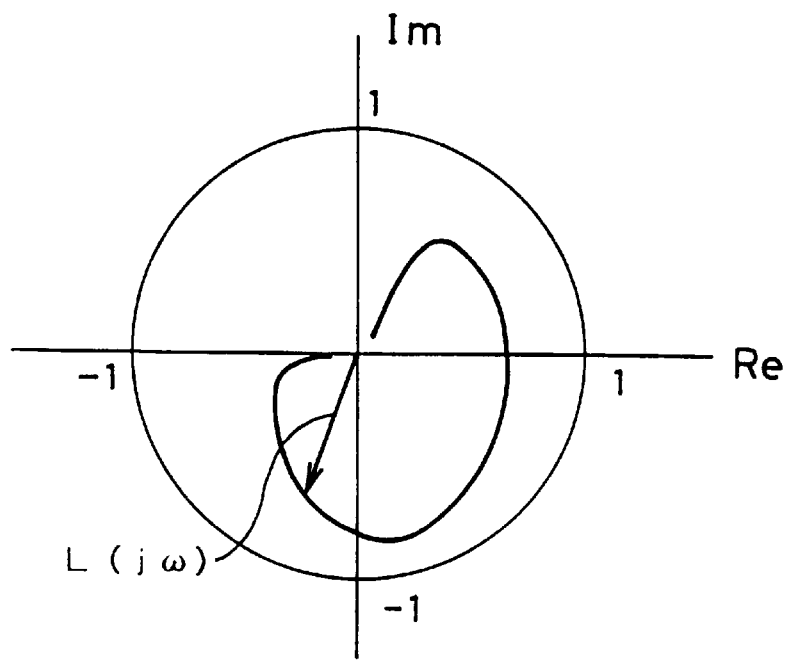
FIG. 10 is a Nyquist plot in the control system.
Figure 11:
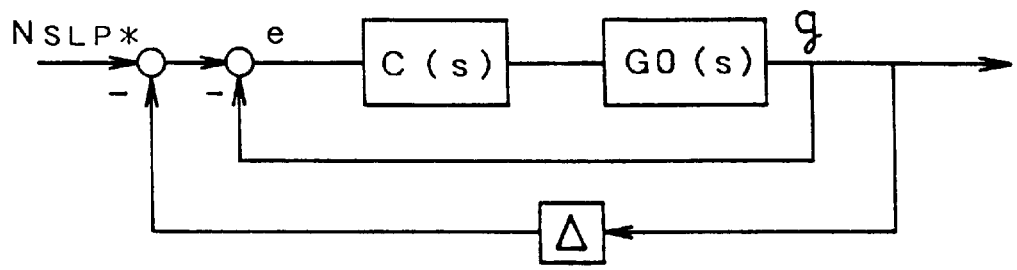
FIG. 11 is a block diagram illustrating an alternative system equivalently converted from the control system of FIG. 9.

Inequality 4 defines the H∞ norm in the single input-output system and gives the maximum gain of the loop transfer function L(s). FIG. 10 shows an exemplified Nyquist plot. As long as the locus of a vector L(jω) is within a unit circle, the closed loop system is stable. Under the condition of generating the characteristic perturbation Δ(s), the system shown in FIG. 9 can be converted equivalently to a system shown in FIG. 11. Based on the Small Gain theorem, the condition for stabilizing the system is to satisfy the following inequality:

$$\|\Delta(s)(I+G0\ C)^{-1}G0\ C\|_\infty < 1 \quad (5)$$

wherein I denotes a unit matrix.

Figure 12:
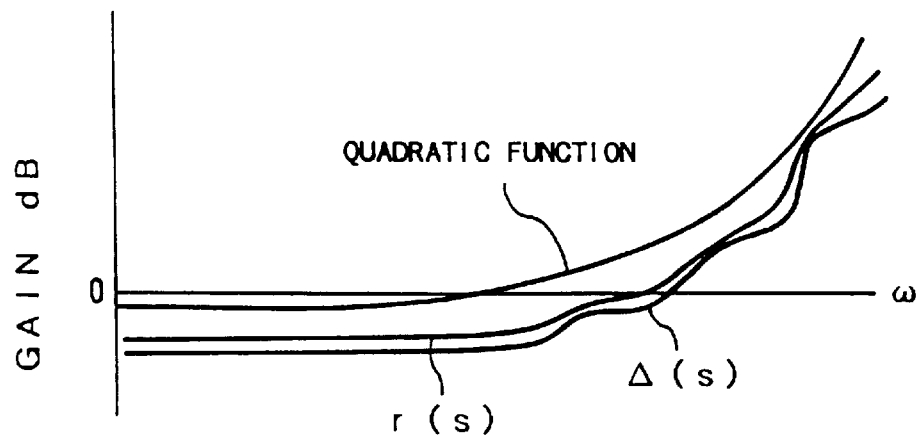
FIG. 12 is a graph showing a characteristic perturbation of class r(s) in a frequency domain.

Characteristic perturbations are generally ascribed to various factors. The characteristic perturbation of the whole closed system gives a complicated curve in the frequency domain as illustrated in FIG. 12. In the graph of FIG. 12, Δ(s) shows summation of characteristic perturbations by a plurality of factors or classes. The characteristic perturbation on the control procedure is approximated by a high-order function substantially representing the actual characteristic perturbation Δ(s). In this embodiment, an eighth-order function r(s) is used. Upon condition that the eighth-order function r(s) always exceeds the actual characteristic perturbation Δ(s) in approximation, that is, as long as the following inequality is satisfied:

$$\|r^{-1}(s) \cdot \Delta(s)\|_\infty \leq 1 \quad (6)$$

the absolute value |r(s)| gives a width of the characteristic perturbation allowable in the control system. Inequality 7c is given by rewriting Inequality 6 into Inequality 7a and using the relationship of Inequality 7b. In the following equations or inequalities, (s) may be omitted for the clarity of expression. For example, G(s) may be shown as G.

Inequalities 7a, 7b, 7c $$|r^{-1}(j\omega) \cdot \Delta(j\omega)| \leq 1 \text{ for } \forall_\omega \quad (7a)$$
$$\therefore \|r^{-1} \cdot \Delta\|_\infty \leq 1$$

$$\|A \cdot B\|_\infty \leq \|A\|_\infty \cdot \|B\|_\infty \quad (7b)$$

$$\|\Delta(I+G0C)^{-1}G0C\|_\infty = \|\Delta r^{-1} r (I+G0C)^{-1}G0C\|_\infty \quad (7c)$$
$$\leq \|r^{-1}\Delta\|_\infty \cdot \|r(I+G0C)^{-1}G0C\|_\infty$$
$$\leq \|r(I+G0C)^{-1}G0C\|_\infty$$

When the right side of Inequality 7c is not greater than 1, that is, when Inequality 8 is satisfied, the condition of Inequality 5 is fulfilled and the loop system after the characteristic perturbation shown in FIG. 9 becomes stable against any characteristic perturbation satisfying Inequality 6.

$$\|r(I+G0\ C)^{-1}\ G0\ C\|_\infty < 1 \quad (8)$$

With the open loop transfer function L(s)=G0(s)C(s), conditional Inequality 8 is rewritten as:

$$\|r(I+L)^{-1} L\|_\infty < 1$$

When T=(I+L)$^{-1}$ L, it is further rewritten as:

$$\|rT\|_\infty < 1 \quad (9)$$

wherein T is known as the complementary sensitivity function which represents a transfer function from a target slip speed to an actual slip speed. When the class r(s) approximating the characteristic perturbation increases in a specific frequency band to decrease the stability, the small complementary sensitivity function in the greatly perturbed frequency band desirably maintains the stability of the control system.

The response against the characteristic perturbation can be enhanced under the substantially fixed stability condition as described below. In the system of FIG. 8, the response characteristics in the control system are expressed by the follow-up speed of the deviation e with respect to a variation in the target slip revolution speed NSLP* and shown as transfer characteristics from the target slip revolution speed NSLP* to the deviation e. The stability margin against an external disturbance d directly affecting the slip speed is shown as transfer characteristics from the external disturbance d to a plant output y (the actual slip revolution speed NSLP in this embodiment). These two characteristics are given by the following equation and generally known as the sensitivity function S:

$$S(s) = \{I + L(s)\}^{-1} \quad (10)$$

The smaller sensitivity function S attenuates the variation in the deviation e from the target value and in the plant output y against the external disturbance d and enhances the response characteristics of the control system. The smaller complementary sensitivity function T and sensitivity function S is accordingly desirable to realize stable and desirable response characteristics against the characteristic perturbation of the control system. The complementary sensitivity function T and the sensitivity function S satisfies the following relationship:

$$S(s) + T(s) = \{I + L(s)\}^{-1} + L(s)\{I + L(s)\}^{-1} \quad (11)$$
$$= I$$

This means that reduction of either the complementary sensitivity function T or the sensitivity function S results in increase in the other function. As generally known, the small sensitivity function S is desirable in a low frequency domain whereas the small complementary sensitivity function T is desirable in a high frequency domain. This means that over-evaluation of the stability condition against the characteristic perturbation, that is, excessive reduction of the complementary sensitivity function T(s) in a lower frequency domain, prevents the sensitivity function S(s) defining the response from being made small in the high frequency domain. Insufficient evaluation of the stability condition against the characteristic perturbation, on the other hand, allows the sensitivity function S(s) to fall in the high frequency domain so as to enhance the response in design, but undesirably decreases the stability over the characteristic perturbation.

Figure 13:
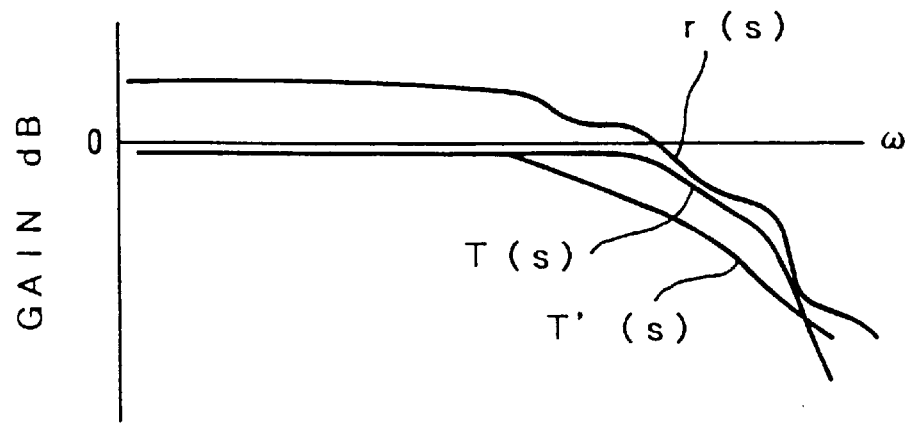
FIG. 13 is a graph showing a complementary sensitivity function T(s) set in the frequency domain.

It is accordingly required to approximate the characteristic perturbation by a high-order function as shown in FIG. 12, thereby decreasing the complementary sensitivity function T(s) only in a required frequency domain as well as making the sensitivity function S(s) small in a range of satisfying the complementary condition shown by Equation 11. In the graph of FIG. 12, r(s) is also approximated by a conventional quadratic function. The approximation by the quadratic function rises in a low frequency domain in order to cover the characteristic perturbation Δ(s) in a higher frequency domain, and thus significantly affects the complementary sensitivity function T(s) as shown in FIG. 13 compared with the approximation by a higher-order function (eighth-order function in the embodiment). In the graph of FIG. 13, T(s) and T'(s) respectively represent approximation of r(s) by a high-order function and that by a quadratic function. The complementary sensitivity function T(s) in approximation by a high-order function falls in a higher frequency domain than the complementary sensitivity function T'(s) in approximation by a quadratic function. This allows the sensitivity function S(s) to fall in the higher frequency domain by a difference between T(s) and T'(s). The approximation by a high-order function accordingly improves the response.

Conventional PID control has gentle frequency characteristics and is equivalent to approximation of the characteristic perturbation by a low-order function as shown in FIG. 12. In the PID control, the sensitivity function S(s) can thus not be lowered in the high frequency domain because of the complementary condition of Equation 11. This results in substantially no enhancing the control response and thereby no attaining the desirable slip control.

The slip control device of the embodiment takes the approach of enhancing the response while maintaining the stability over the characteristic perturbation under the complementary condition of the complementary sensitivity function T(s) and the sensitivity function S(s) shown in Equation 11. A controller having high-order frequency characteristics of the above approach is designed based on time series data including at least the plant input and the deviation, thereby realizing the desirable slip control.

Based on the general conditions described above, the controller C(s) is designed in the following manner according to the characteristics of the lock-up clutch 32 of the torque converter 12, which is a plant in the embodiment.

Figure 14:
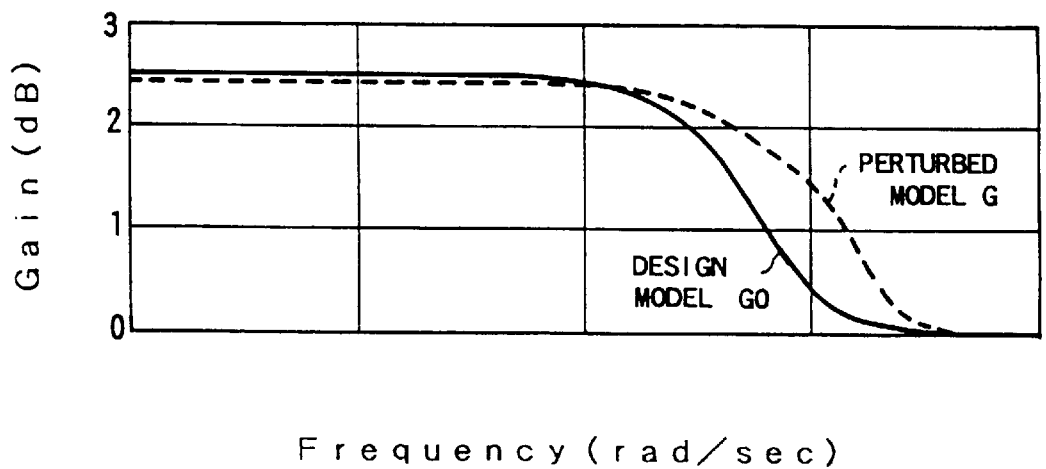
FIG. 14 is a graph showing the gain characteristics of the lock-up clutch 32 plotted against the frequency domain.
Figure 15:
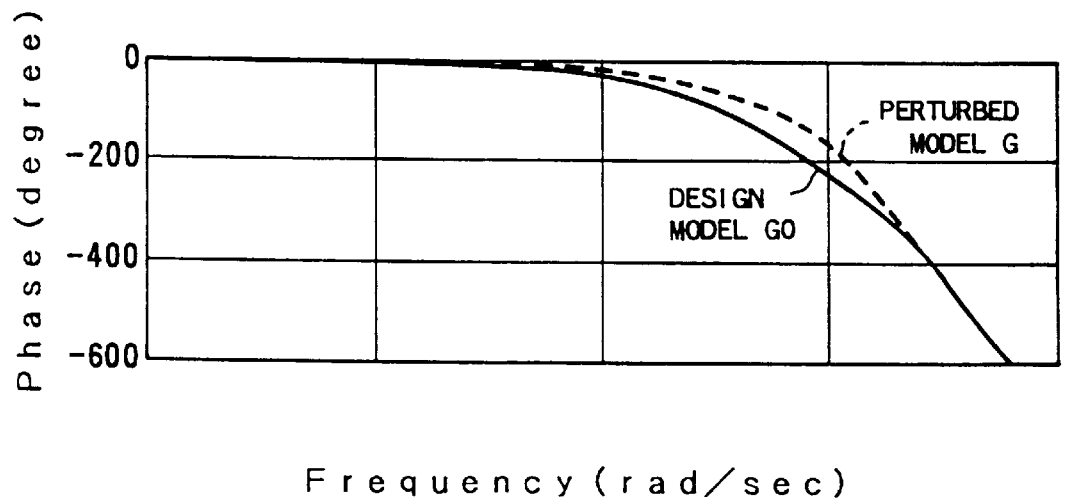
FIG. 15 is a graph showing the phase characteristics of the lock-up clutch 32 plotted against the frequency domain.
Figure 16:
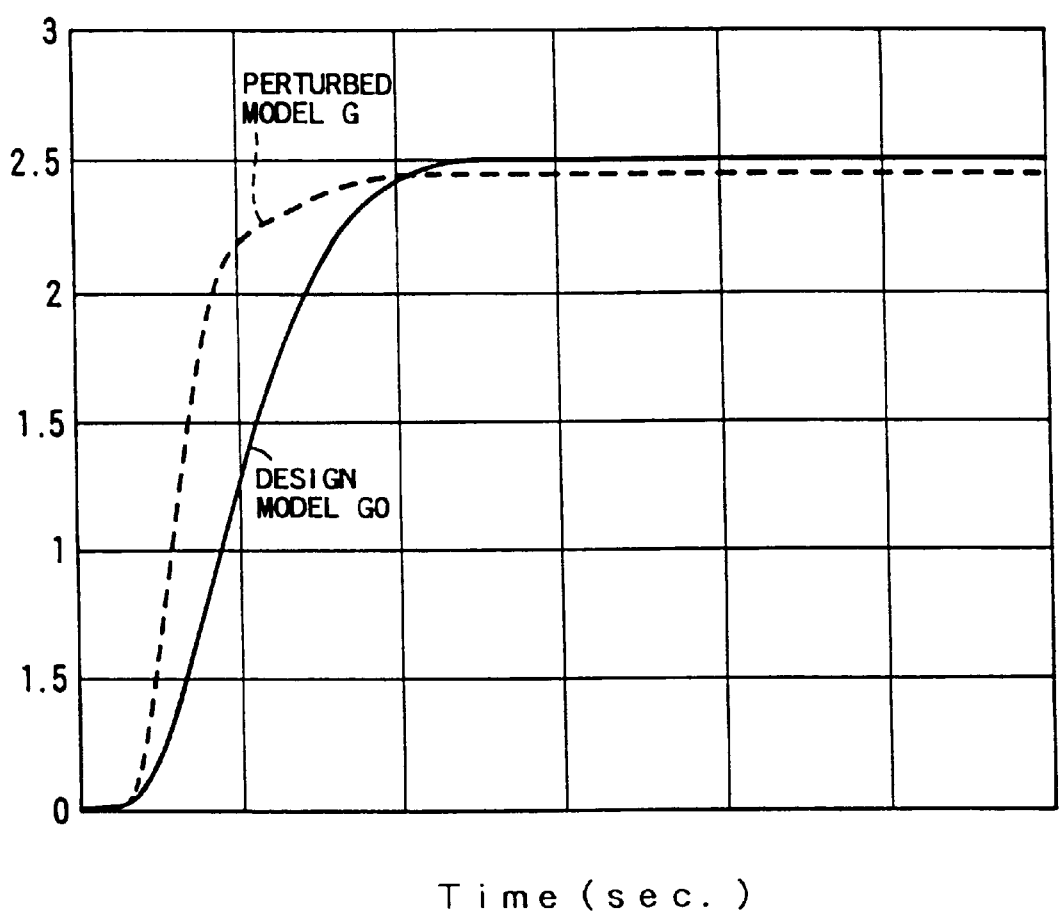
FIG. 16 is a graph showing an exemplified control procedure of the lock-up clutch 32 with a designed model GO and a perturbed model G.

FIGS. 14 and 15 show the characteristics of the plant as an example. FIG. 14 are Bode plots of gain-frequency characteristics from the plant input of the lock-up clutch 32 or the solenoid current to the slip revolution speed NSLP at the vehicle speed of 45 km/h. FIG. 15 are also Bode plots of the phase-frequency characteristics. The lock-up clutch 32 is operated at a fixed vehicle speed under a load increasing condition. In FIGS. 14 and 15, the broken line represents a characteristic perturbation of the plant of the embodiment whereas the solid line represents design model characteristics. Both the gain and the phase of the plant are significantly varied from those of the design model. FIG. 16 shows the response against a stepped variation in the instruction value along a time axis under the condition that no feedback control is applied to the plant. The graph of FIG. 16 shows a sharp rise against the load variation when the characteristic variations shown in FIGS. 14 and 15 occur.

Figure 36:
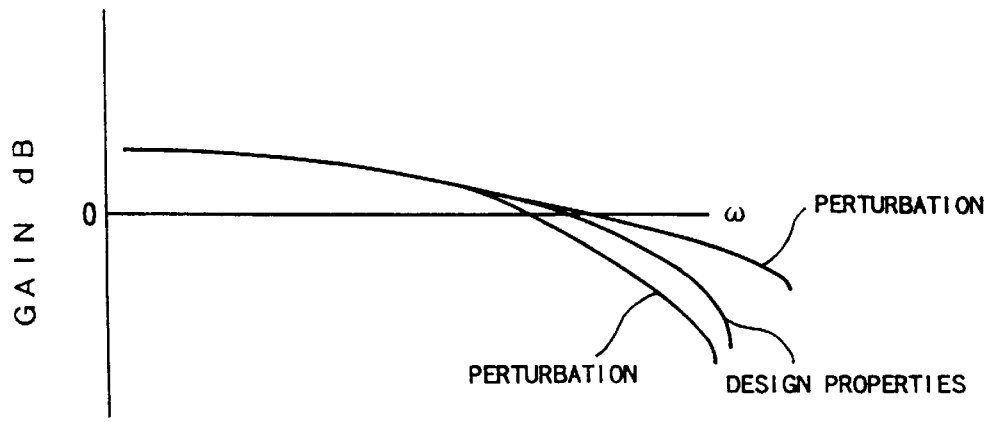
FIG. 36 is a graph showing characteristic perturbations in a slip control system of a lock-up clutch.
Figure 37A:
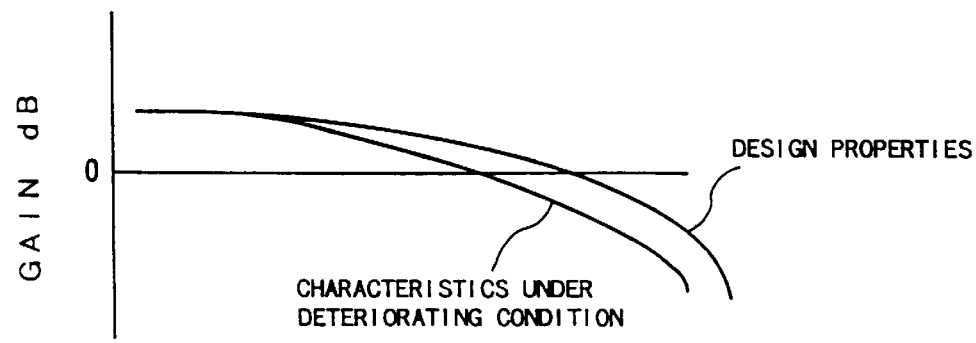
FIGS. 37A and 37B show characteristic perturbations under the deteriorating condition.
Figure 37B:
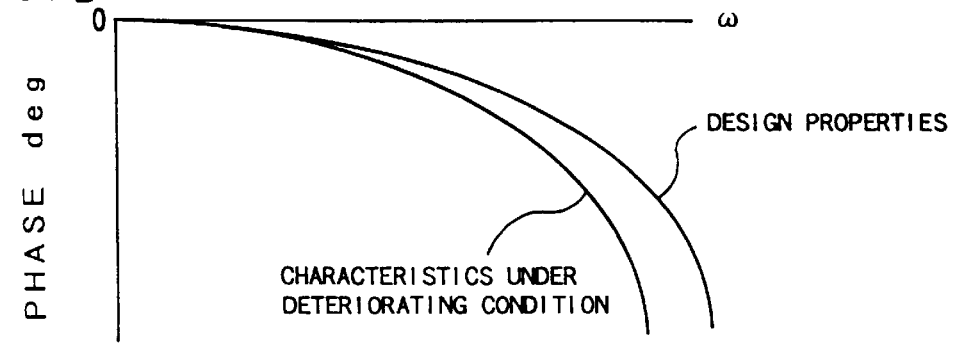
Figure 38:
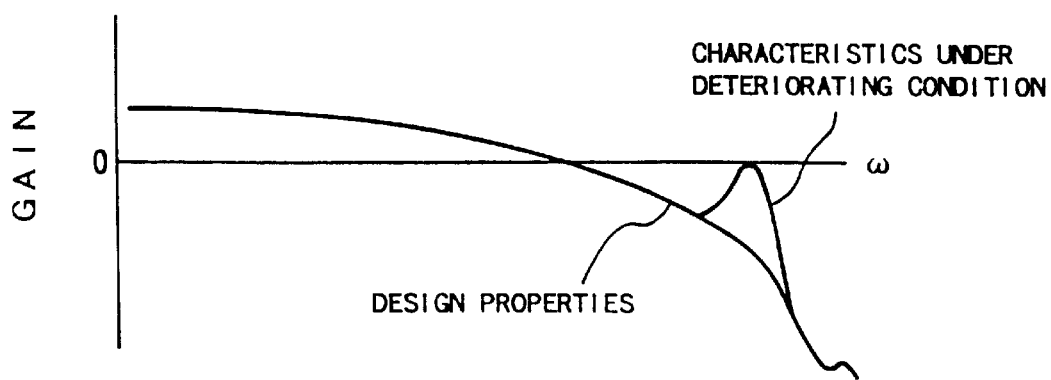
FIG. 38 is a graph showing another example of characteristic perturbation under the deteriorating condition.

In the control system of the embodiment, large characteristic perturbations are expected in a high frequency domain as shown in FIGS. 36 through 38 and the characteristic perturbation class r(s) is expressed as a high-order function as shown in FIG. 12.

In the embodiment, the characteristic variation is approximated by an eighth-order function, and an evaluation function of Inequality 12 given below is applied to decrease the complementary sensitivity function T in a high frequency domain having a large characteristic variation and lower the sensitivity function S in a range of satisfying the complementary condition shown by Equation 11. In the description below, the characteristic perturbation class r(s) related to the sensitivity function S and the complementary sensitivity function T is expressed as weighting functions W1 and W2. By using the weighting function W2(s), the restriction condition of the complementary sensitivity function T for defining the stability over the characteristic perturbation is given by:

$$\|W2(s)T(s)\|_\infty < 1$$

By using the weighting function W1(s), the restriction condition of the sensitivity function S representing the response is expressed as:

$$\|W1(s)S(s)\|_\infty < 1$$

Figure 18:
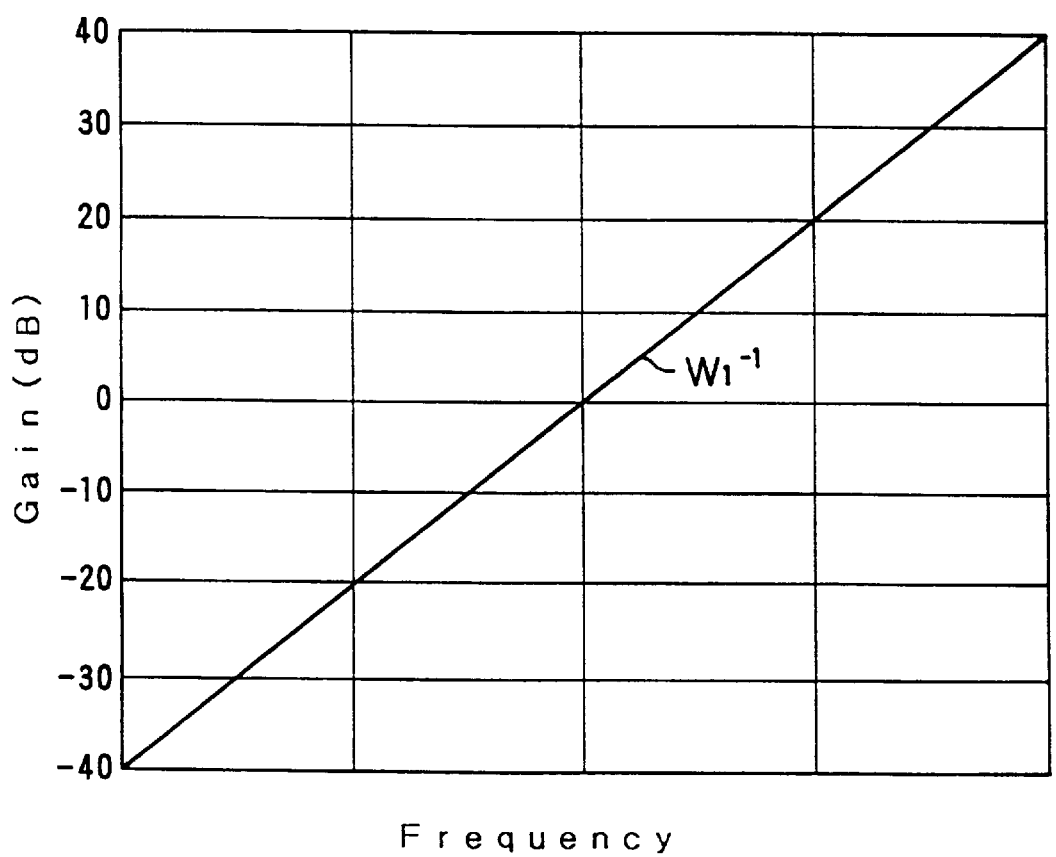
FIG. 18 is a graph showing an exemplified setting of the weighting function W1.
Figure 19:
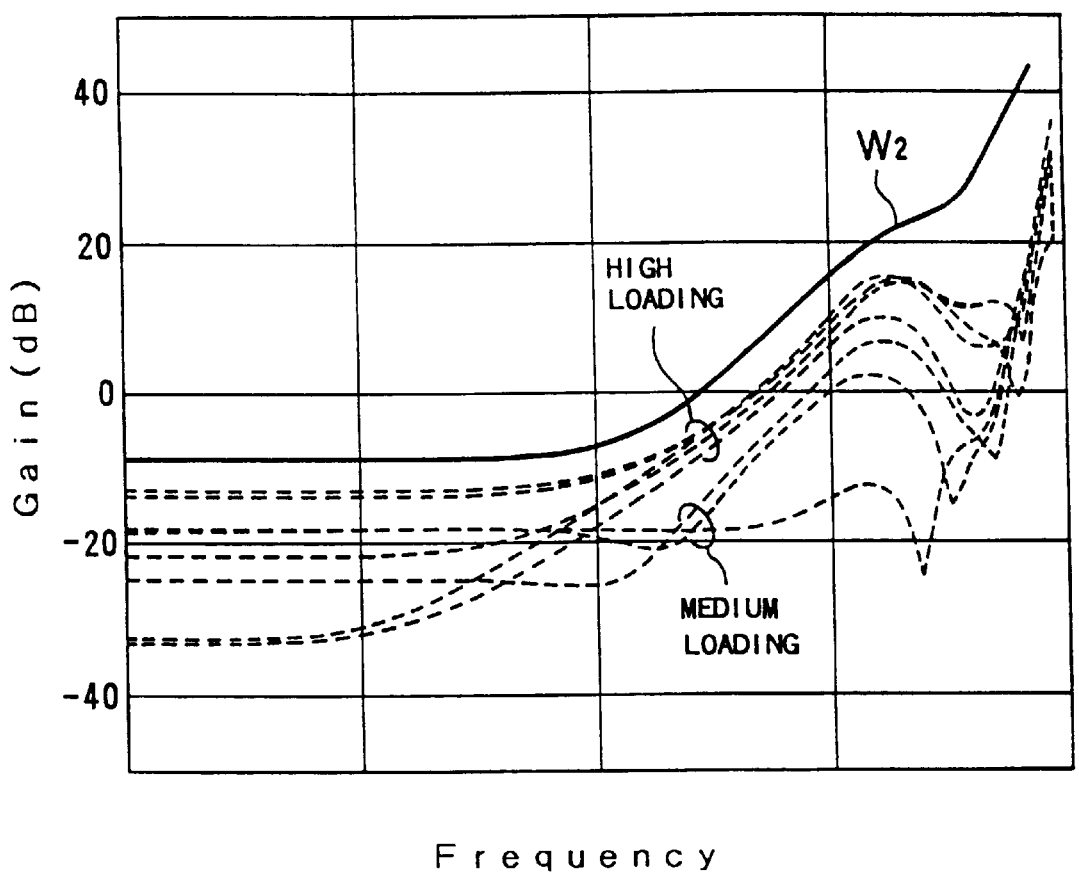
FIG. 19 is a graph showing characteristic perturbations of the control system with different loadings and the weighting function W2 correspondingly set.

Exemplified designs of the weighting functions W1 and W2 are shown in FIGS. 18 and 19. The weighting functions W1 and W2 are complementary to each other as clearly seen in FIG. 18. Since the norm satisfies Inequality 12a given below, the above restriction conditions are fulfilled by Inequality 12b also given below.

$$\max\{\|x\|_\infty, \|y\|_\infty\} \le \left\|\begin{array}{c} x \\ y \end{array}\right\|_\infty \quad (12a)$$

$$\left\|\begin{array}{c} W1(s)S(s) \\ W2(s)T(s) \end{array}\right\|_\infty < 1 \quad (12b)$$

The controller C(s) satisfying the requirements of the control performance and robust can be designed by applying Equation 13 given below to a transfer function from exogenous inputs w to a controlled variable z under the feedback control condition.

$$Tzw = \left[\begin{array}{c} W1(s)S(s) \\ W2(s)T(s) \end{array}\right] \quad (13)$$

Figure 17:
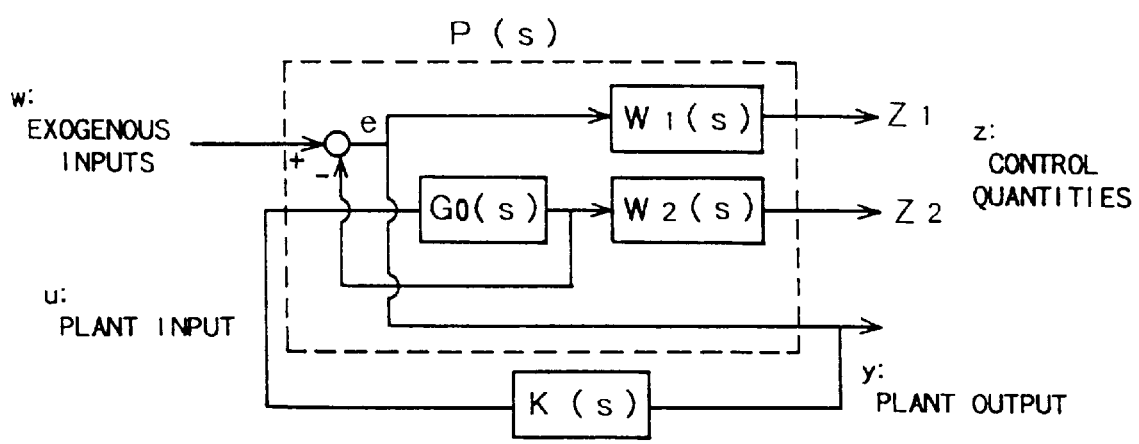
FIG. 17 is a block diagram showing an augmented control system.

FIG. 17 is a block diagram of the control system by taking account of the weighting functions W1 and W2. In FIG. 17, w denotes exogenous inputs such as the target slip revolution speed NSLP* and disturbance, z (z1, z2) physical quantities to be controlled (the product of the deviation and the weighting function W1 in the frequency domain and the product of the slip revolution speed and the weighting function W2 in the frequency domain), y a plant output observed or the slip revolution speed NSLP detected by a sensor, and u a plant input (duty ratio for determining the current of the linear solenoid valve 52). G0(s), P(s), and K(s) respectively represent a plant, an augmented plant, and a controller. The control system is expressed by a state equation using a variable of state x:

$$dx/dt = A \cdot x + B1 \cdot w + B2 \cdot u$$

$$z = C1 \cdot x + D11 \cdot w + D12 \cdot u$$

$$y = C2 \cdot x + D21 \cdot w + D22 \cdot u \quad (14)$$

The control system is also expressed as a transfer function:

$$\left[\begin{array}{c} z(s) \\ y(s) \end{array}\right] = P(s) \cdot \left[\begin{array}{c} w(s) \\ u(s) \end{array}\right] \quad (15)$$

The transfer function matrix of P(s) is shown as an augmented plant including the plant G0(s) and the weighting functions W1 and W2:

$$P(s) = \left[\begin{array}{cc} W1 & -W1G0 \\ 0 & W2G0 \\ I & -G0 \end{array}\right] \quad (16)$$

When the feedback control u(s)=K(s)y(s) is executed by the controller K(s) shown in the block diagram of FIG. 17, the H∞ control problem is to guarantee the stability of the closed loop system with respect to the transfer function Tzw from exogenous inputs w to a control quantity z and obtain the controller K(s) satisfying the inequality ||Tzw||∞<1.

Figure 20:
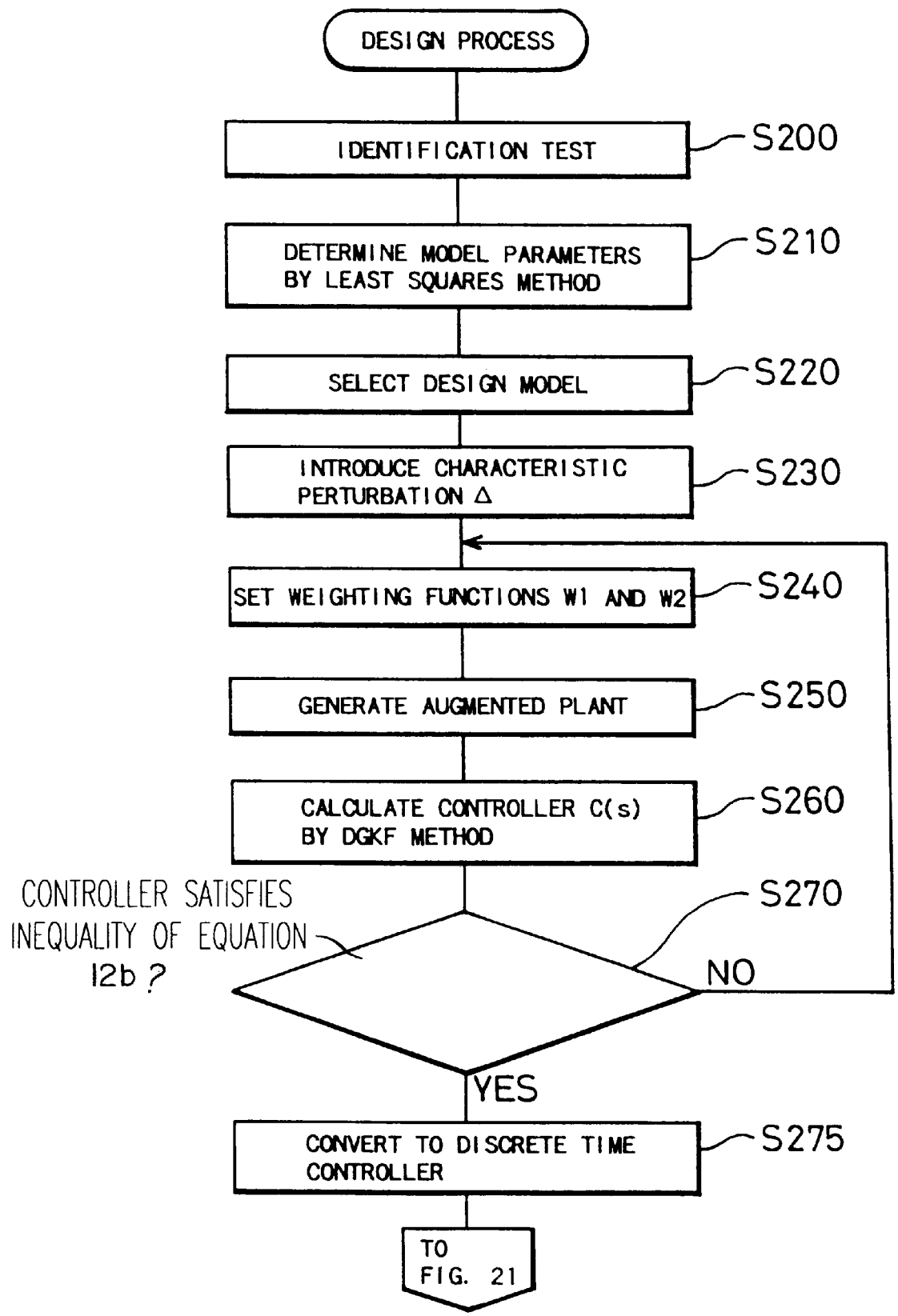
FIGS. 20 and 21 are flowcharts showing concrete steps of designing the slip control apparatus of the first embodiment.

Concrete design process of the clutch slip control device based on the above theory is explained with the flowchart of FIG. 20.

At a first design step (steps S200 and S210), plant characteristics are identified as a numerical model. The numerical model is ideally introduced based on physical or dynamic considerations of a plant. It is, however, difficult to physically describe the dynamics of a frictional joint of the frictional clutch of the embodiment. The experimental identification method is accordingly applied to the embodiment. Physical considerations-based identification of the clutch dynamics as a numerical model may be allowed for other type of plants (clutches) or by introduction of an appropriate controlled variable.

In the embodiment, an identification test is executed first at step S200. A specific signal corresponding to a plant input is generated by a random signal generator. Upon condition that a driving current Isol runs through the linear solenoid valve 52 based on the specific signal, the actual slip revolution speed NSLP is calculated from the engine speed Ne and the input shaft rotating speed Nin. Data of the slip revolution speed NSLP are stored in a storage device (RAM 86 shown in FIG. 3). This identification test is executed under primary operating conditions of a real vehicle and driving conditions of various classes giving characteristic perturbations.

At step S210, a number of data stored in the storage device are processed by least squares method and model parameters ami and bmi, which can represent the output or the slip revolution speed NSLP, are determined according to the following equation:

$$y(k) = \sum_{i=1}^{n} ami \cdot y(k-i) + \sum_{i=0}^{n} bmi \cdot u(k-i-kd) \quad (17)$$

where u, y, k, and n respectively denote a plant input, a slip revolution speed NSLP or a plant output, a parameter representing the current time, and an order; ami and bmi represent model parameters; and Kd represents a dead time before variation in the plant input u actually affects the plant output y.

At step S220, a design model is selected among a number of models determined to be available by the system identification. A characteristic perturbation Δ is then introduced from the design model at step S230. The design model is selected generally based on a primary operating condition. When the operating condition for realizing a smaller characteristic perturbation is significantly different from the primary operating condition, the former may be selected as a design model G0. Once the design model G0 is determined, various characteristic perturbations are obtainable from a perturbed variation model G based on the definition of Equation 3. The characteristic perturbation Δ shown in FIG. 12 is summation of a plurality of characteristic perturbations. FIGS. 14 through 16 illustrate the responses under specific conditions of the models thus determined.

At step S240, the weighting functions W1 and W2, which are key functions of the H∞ controller, are set according to the characteristic perturbation Δ determined at step S230. Here especially important is the weighting function W2 corresponding to the complementary sensitivity function T(s). The weighting function W2 is approximated by an eighth-order function to include characteristic perturbations due to load, turbine revolution speed, and other factors as shown in FIG. 19. In other words, the weighting function W2 in FIG. 19 is illustrated as a curve approximating envelopes of various characteristic perturbations. The weighting functions W1 is, on the other hand, relatively simple as illustrated in FIG. 18. The weighting function W1 is modified several times in a general design cycle to satisfy the design specification.

After the design of the weighting functions W1 and W2, an augmented plant of Equation 16 is created at step S250 and an available controller is then calculated by a predetermined solution at step S260. A typical solution used for the calculation of a controller is DGKF method proposed by Doyle and Glover et al. The DGKF method is described in detail in 'State Space solutions to standard H2 and H∞ control problems' (J. Doyle, K. Glover et al., IEEE Trans. Automat. Contr., AC-34, No. 8, pp.831–847).

After the calculation of the controller, it is determined at step S270 whether the controller satisfies Inequality 12b. In general procedures, the weighting function W1 for defining the sensitivity function S(s) is provisionally set under relatively loose conditions and an available controller is calculated based on the provisional weighting function W1 at an initial stage of design. The setting of the weighting function W1 is then varied gradually so as to make the sensitivity function S(s) small under the condition of Inequality 12b. This procedure is repeated until the sensitivity function S(s) reaches the minimum under the condition of Inequality 12b.

Figure 21:
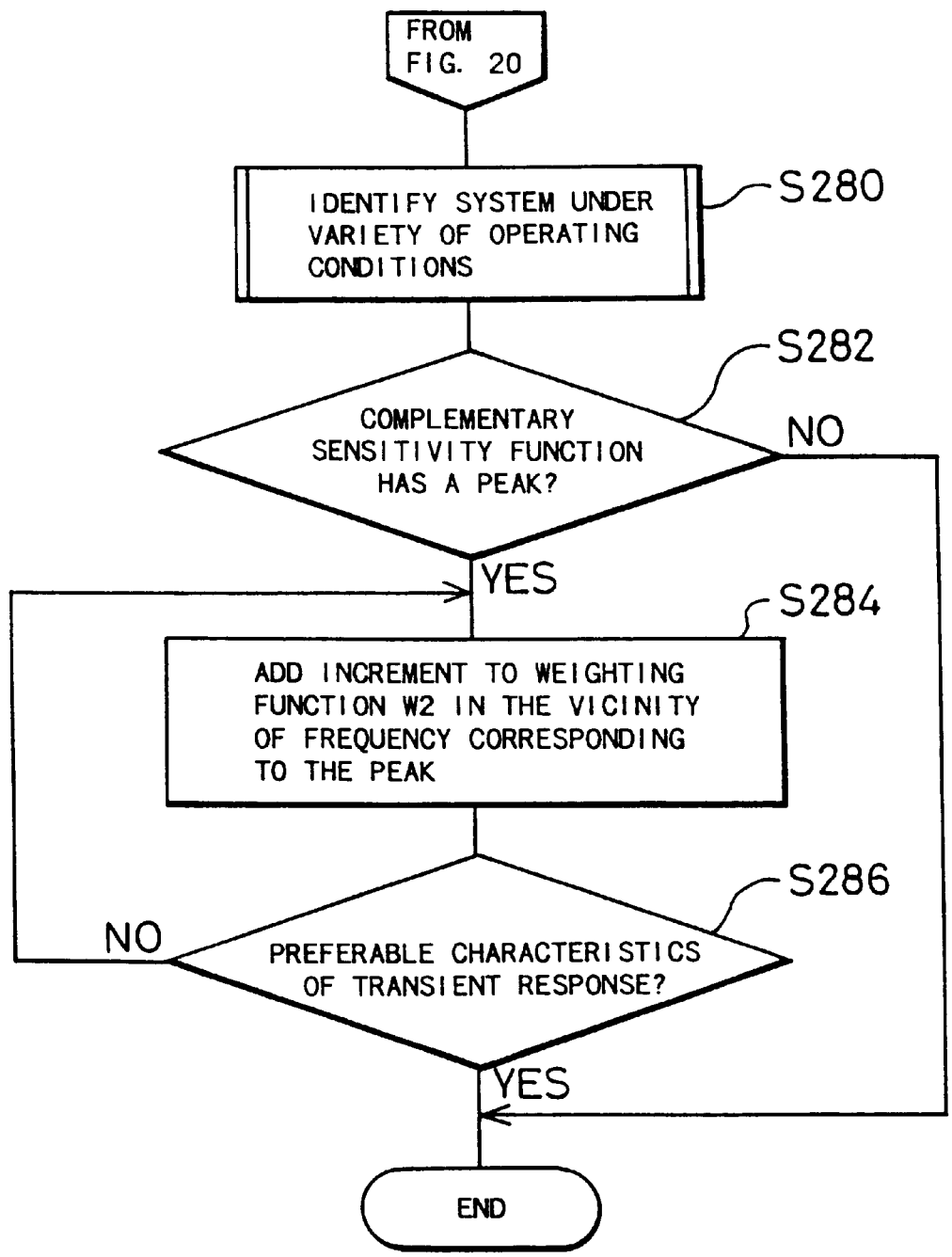

After the controller satisfying the required performance at the design point is obtained by repeating the processing of steps S240 through S270, the controller is converted to a discrete time controller applicable to a real system at step S275. The discrete time controller is then corrected by taking into account a peak of the complementary sensitivity function T. The concrete steps of the correction procedure are shown in the flowchart of FIG. 21. At step S280, the system is identified by varying the operating conditions of the clutch (plant). By way of example, the system was identified at the sampling time of approximately 40 msec according to Equations (18) and (19) given below:

$$y(k) = 1.63 \cdot y(k-1) - 1.04 \cdot y(k-2) + 2.25 \cdot y(k-3) + \quad (18)$$
$$4.35e^{-1} \cdot y(k-4) - 3.17e^{-1} \cdot y(k-5) + 5.15e^{-2} \cdot u(k-4) -$$
$$1.96e^{-3} \cdot u(k-5) + 7.40e^{-3} \cdot u(k-6) + 6.50e^{-2} \cdot (k-7)$$

$$y(k) = 1.69 \cdot y(k-1) - 7.02e^{-1} \cdot y(k-2) + \quad (19)$$
$$3.67e^{-1} \cdot y(k-3) - 8.27e^{-1} \cdot y(k-4) +$$
$$4.20e^{-1} \cdot y(k-5) + 2.17e^{-2} \cdot u(k-2) +$$
$$4.87e^{-2} \cdot u(k-3) + 4.61e^{-2} \cdot u(k-4) +$$
$$7.69e^{-2} \cdot u(k-5) - 3068e^{-2} \cdot u(k-6)$$

wherein y(k) and u(k) respectively denote a slip rate and a duty input with respect to a solenoid. Equation (18) is a mathematical representation of a designed model used for identification as a discrete time model. Equation (19) is a mathematical representation of a perturbed model used for identification. The perturbed model and the designed model have different subscripts for the duty input u(k) because of the difference in dead time between a variation in duty input u(k) and a variation in actual output.

The characteristics of the plant (system to be controlled) are identified with these models by varying the operating conditions of the system. The operating conditions, which are varied in the actual operating ranges to evaluate the characteristics of the plant, include the slip speed, engine loading, the revolving speed of turbine, the temperature of operating oil, and the time-based change. The test ranges of these operating conditions are listed in FIG. 22. Some combinations are out of the target area of slip control and thereby not identified here.

Figure 2:
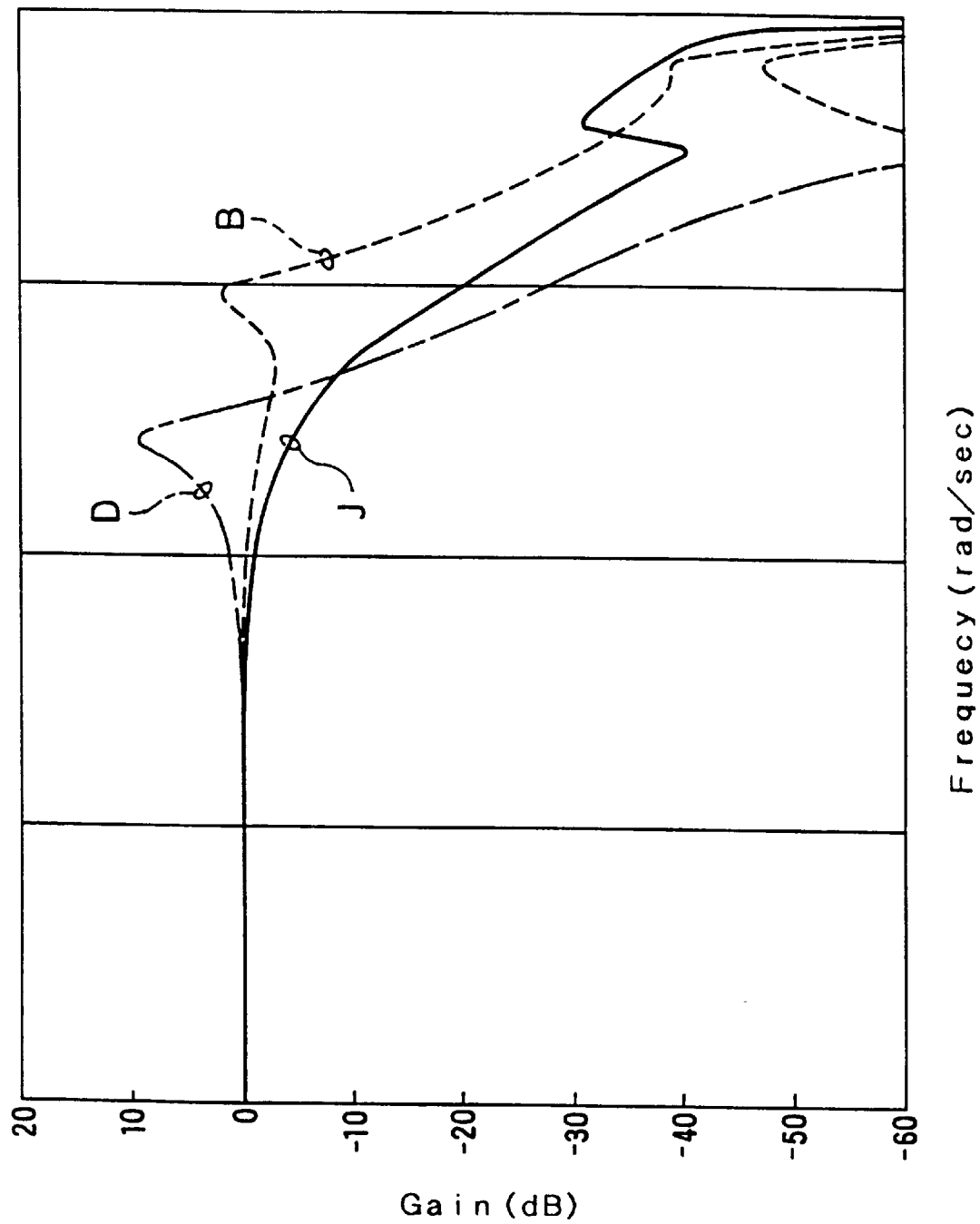
FIG. 2 shows characteristic curves of complementary sensitivity function T having a peak.

At step S282 in the flowchart of FIG. 21, it is determined whether the complementary sensitivity function T has a peak, based on the evaluated characteristics of the complementary sensitivity function T of the plant. Characteristic curves of the complementary sensitivity function T thus obtained are shown in FIG. 2 as a gain-frequency plot. Referring to FIG. 2, the curve of solid line J represents a complementary sensitivity function at a design point. Like the curve of solid line J, the complementary sensitivity function T has a decreasing gain and a slowing phase with an increase in frequency under most operating conditions. The complementary sensitivity function T, however, has a peak at several operating points. The one-dot chain line D represents a curve of complementary sensitivity function T having a peak in a relatively low frequency domain, and the broken line B representing the same having a peak in a relatively high frequency domain.

Figure 23:
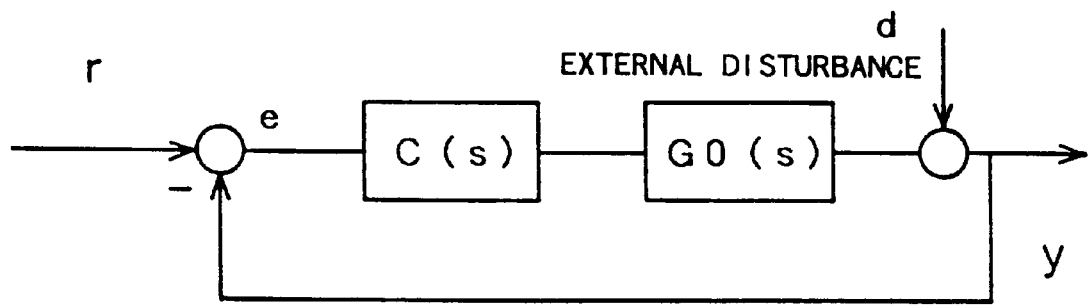
FIG. 23 is a block diagram of a general control system which proves that the complementary sensitivity function T corresponds to a transfer function.
Figure 24:
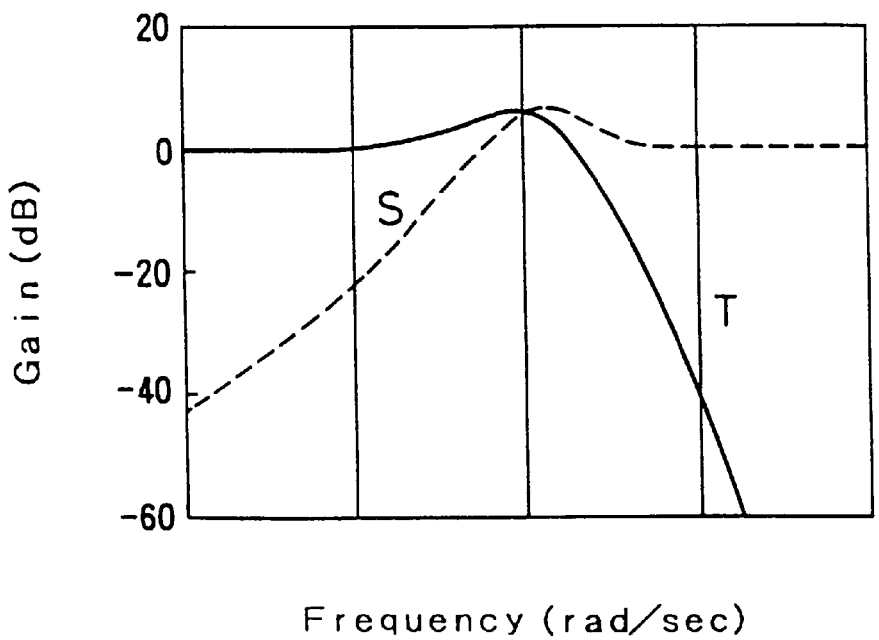
FIG. 24 shows a peak in the complementary sensitivity function T.
Figure 25:
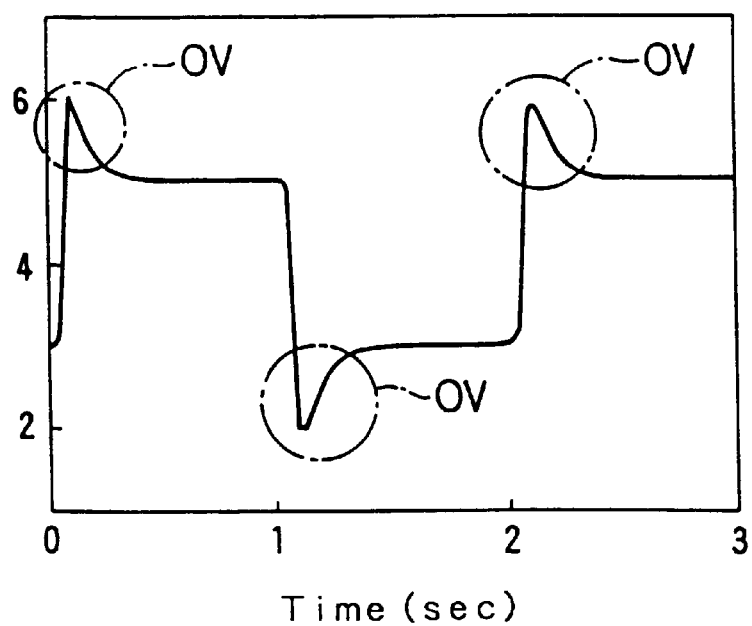
FIG. 25 shows a transient response when the complementary sensitivity function T has a peak.

The complementary sensitivity function T is an index representing robust stability as well as characteristics of transient response. FIG. 23 is a block diagram showing a general control system corresponding to the slip control system of FIG. 8. Referring to FIG. 23, the complementary sensitivity function T corresponds to a closed-loop transfer function from a target 'r' to an output 'y'. This means that transient characteristics specified by the transfer function T from the target 'r' to the output 'y' can be designed through evaluation of the complementary sensitivity function T. Referring to FIG. 25, a transient response defined by the complementary sensitivity function T having a peak as shown in FIG. 24 shows remarkable overshooting when the target value has a variation expressed by a step function.

Figure 1:
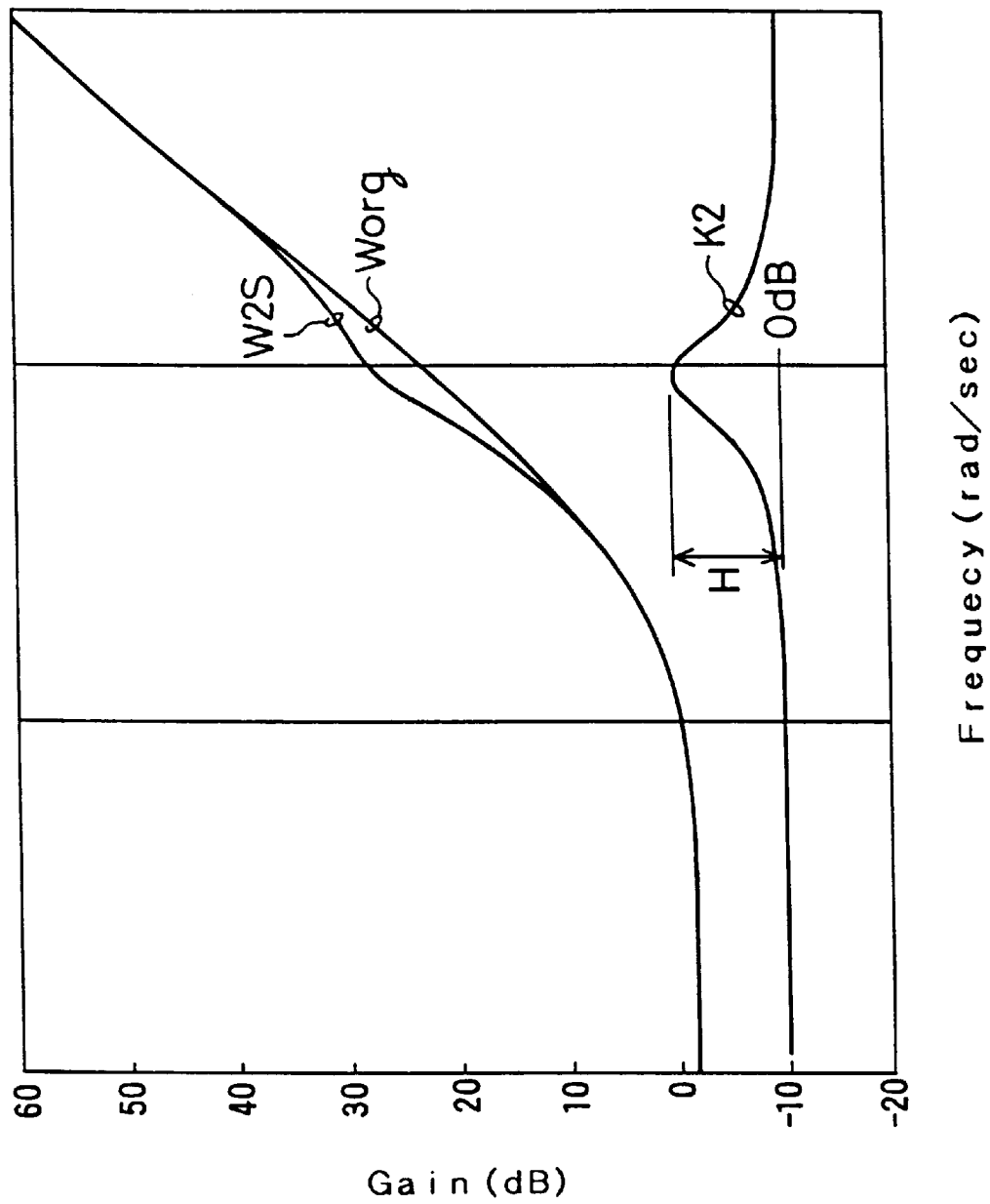
FIG. 1 is a graph showing a correction process of adding an increment to a weighting function W2.
Figure 26:
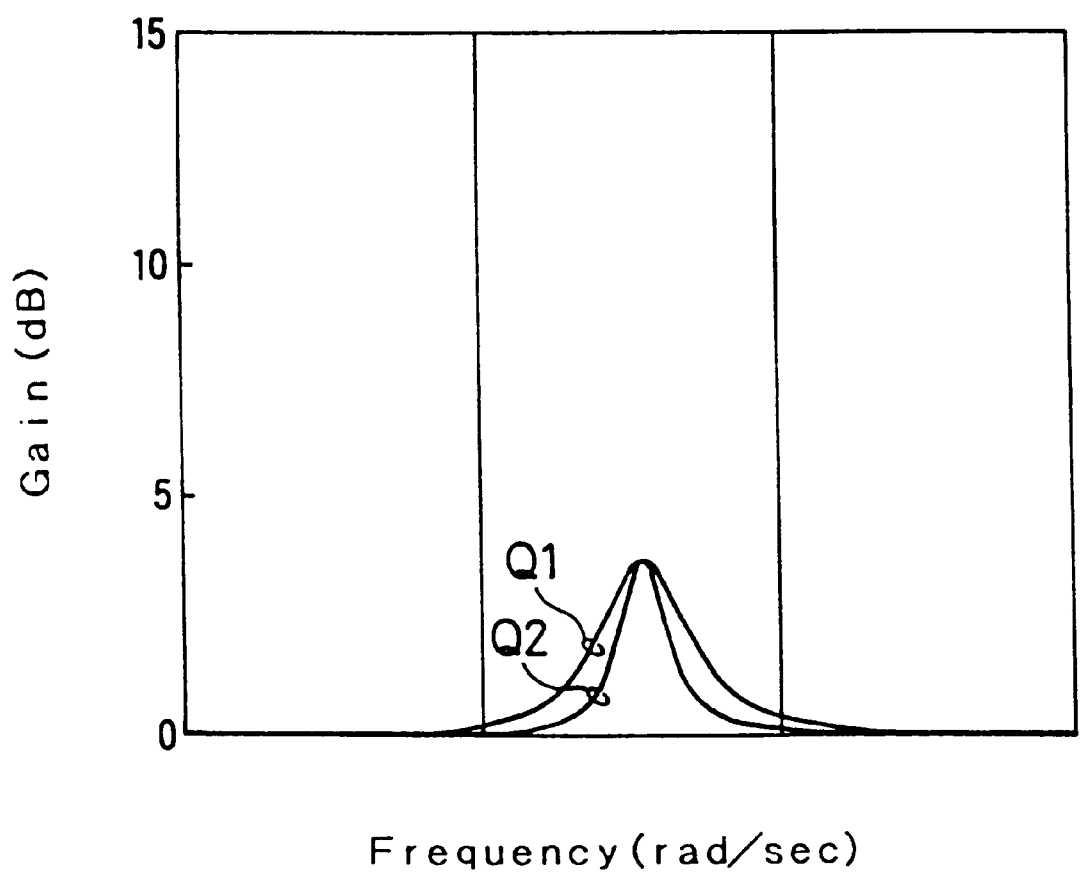
FIG. 26 is a graph showing a process of adding an increment to the weighting function W2.

When identification of the system under the variety of driving conditions shows existence of a plurality of peaks in the curve of complementary sensitivity function T as shown in FIG. 2, the answer becomes YES at step S282 in the flowchart of FIG. 21. The program then proceeds to step S284, at which a predetermined increment is added to the weighting function W2 in the vicinity of the frequency at which the complementary sensitivity function T has a peak. In accordance with a concrete procedure, a predetermined increment K2 is added to an originally designed weighting function Worg as shown in FIG. 1. The predetermined increment K2 is defined as a bell-shaped function Q1 or Q2 shown in FIG. 26, which has a height H (dB) and a predetermined extent around the frequency at which the complementary sensitivity function T has a peak. In this embodiment, the predetermined increment K2 is designed according to Equation (20) given below:

$$--K2 = \frac{s^2 + (a/c)s + d^2}{s^2 + (b/c)s + d^2} --. \quad (20)$$

A corrected weighting function W2S is expressed as:

W2S=Worg×K2

Since the plot of FIG. 1 has a logarithmic scale on the ordinate, the corrected weighting function W2S is shown as a sum of Worg and K2. There are three coefficients 'a', 'b', 'c', and 'd' in Equation (20). As is known to those skilled in the art, with an increase in coefficient 'c', the predetermined increment K2 has a narrower peak width like the curve Q2 in FIG. 26. With an increase in 'a/b', the increment K2 has a greater peak height H (see FIG. 1). The frequency at which a peak of increment exists can be adjusted by the coefficient 'd'. The shape of the predetermined increment K2 can readily be varied by adjusting these coefficients 'a' through 'd'.

After an increment is added to the weighting function W2 at step S284 in the flowchart of FIG. 21, the program proceeds to step S286, at which it is determined whether a control under the specific driving condition shows preferable characteristics of transient response. When the characteristics of transient response are not preferable, the program returns to step S284, at which the increment added to the weighting function W2 is adjusted again. This process is repeated until the transient response shows preferable characteristics. As discussed previously, the size and central frequency of the increment can be varied by adjusting the coefficients 'c' and 'a/b' of Equation (20). The program exits from the design routine shown in the flowcharts of FIGS. 20 and 21 when preferable transient characteristics are obtained. In the routine, the processing of steps S210 through S286 may be executed with 'MATLAB', that is, CAD of the control system.

Figure 27:
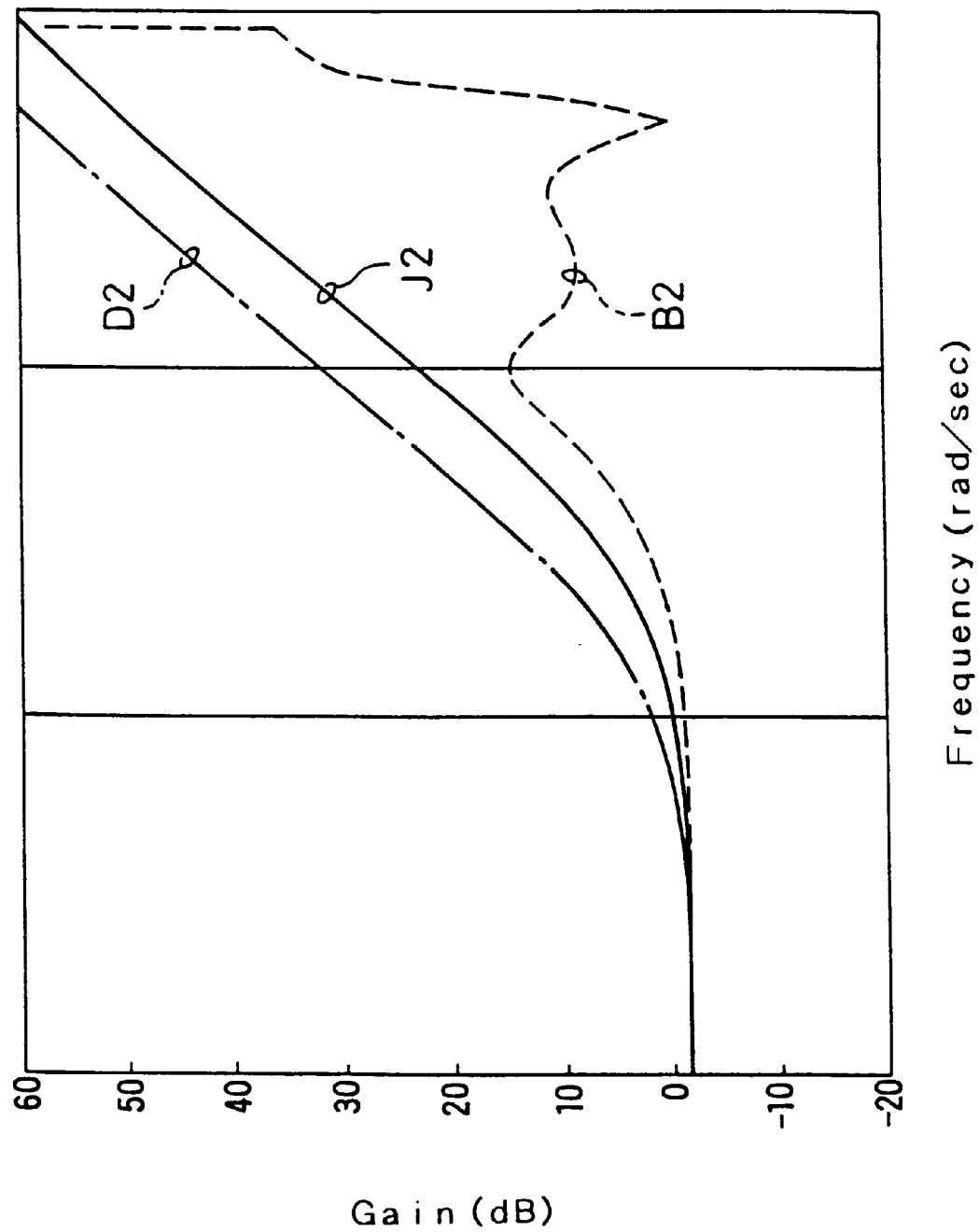
FIG. 27 is a graph showing another process of correcting the weighting function W2.

In the above design procedure, when control under a variety of operating conditions shows the presence of a peak in the complementary sensitivity function T, an increment is added to the weighting function W2 in a range corresponding to the frequency domain in which the complementary sensitivity function T has a peak. This process implies that the weighting function W2 is shifted leftward only in the frequency domain in which the complementary sensitivity function T has a peak. This correction process is compared with another correction process shown in FIG. 27. The correction curve of FIG. 27 is obtained by shifting the whole weighting function W2 leftward. With respect to an actual characteristic perturbation shown by the curve of broken line B2, a weighting function is designed as shown by the curve of solid line J2. When the complementary sensitivity function T has a peak in a certain frequency domain, which causes overshooting to be observed in the characteristic curve of transient response, shifting the whole weighting function as shown by the curve of one-dot chain line D2 in FIG. 27 may improve the characteristics of transient frequency. In this embodiment, the originally designed weighting function Worg (shown by the curve of solid line J2 in FIG. 27) is given by:

$$W2 = \frac{\{(1/p)s + 1\}^2}{1.2\{(1/q)s + 1\}^2} \quad (21)$$

In Equation (21), with a decrease in coefficient 'p', for example, from the value '2' to the value '1', the weighting function Worg is shifted toward the lower frequency domain.

Figure 28:
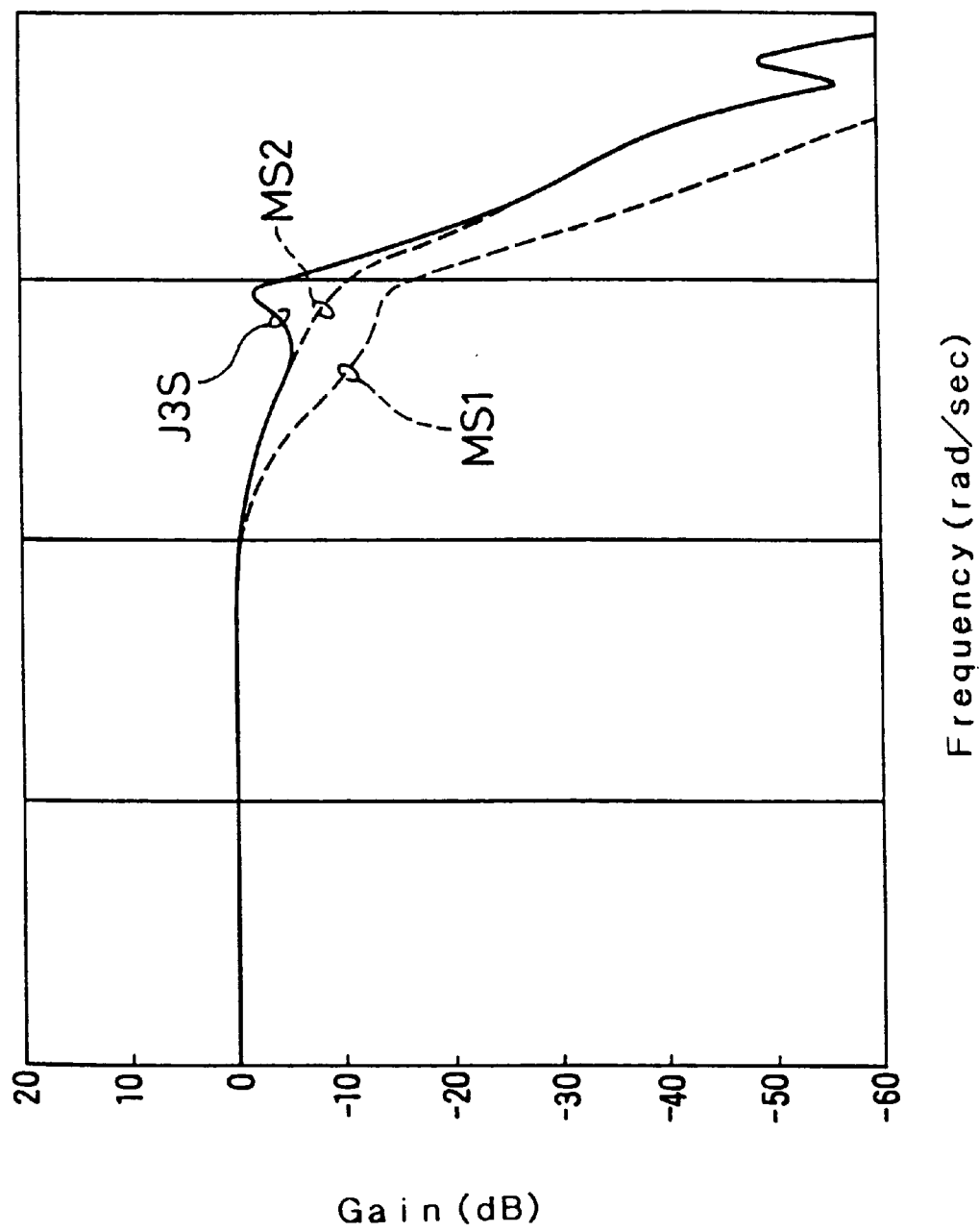
FIG. 28 is a graph showing a process of correcting the complementary sensitivity function T.

When the complementary sensitivity function T (given as the curve of solid line J3S in FIG. 28) has a peak in a certain frequency domain, the correction procedure of the embodiment (correction shown in FIG. 1) can suppress only the peak of the curve J3S as shown by the curve of broken line MS2. The known correction process shown in FIG. 27, which shifts the whole weighting function toward the lower frequency domain, on the other hand, only shifts the whole complementary sensitivity function T toward the lower frequency domain as shown by the curve of broken line MS1 in FIG. 28. This correction is, however, conflicting with the requisite for improving the response, that is, the complementary sensitivity function T should be shifted toward the high-frequency domain on the assumption that the complementary sensitivity function T and the sensitivity function S have a satisfactory complementary relationship.

Referring to FIGS. 29A and 29B, when a target slip revolution speed Ns1p* is changed from 200 rpm to 300 rpm, the control of the embodiment gives an excellent transient response. When no incrementing correction is carried out for the complementary sensitivity function T having a peak, fluctuations accompanied with overshooting are observed in the curve of transient response given by the solid line J3 in FIGS. 29A and 29B. Even in this case, the stability of control is assured and the fluctuations will be converged sooner or later, although the convergence is rather poor. When the correction process of the embodiment is carried out to add an increment to the weighting function W2 only in the specific frequency domain and reduce the peak of the complementary sensitivity function T, the transient response given as the curve of broken line M2 in FIGS. 29A and 29B show an excellent convergence and realizes preferable control of the slip revolution speed with only a little drop of response. When the correction process of FIG. 27 is carried out to shift the whole weighting function W2 toward the lower frequency domain, on the other hand, a remarkable drop in response is observed while the fluctuations at the transient response disappearing as shown by the curve of slid line M1 in FIGS. 29A and 29B.

As is apparent from the foregoing description of the first embodiment, when the complementary sensitivity function T has a peak in a specific frequency domain under a predetermined operating condition, an increment is added to the weighting function W2 only in the specific frequency domain. This improves the convergence of transient response while minimizing the drop of response.

Figure 30A:
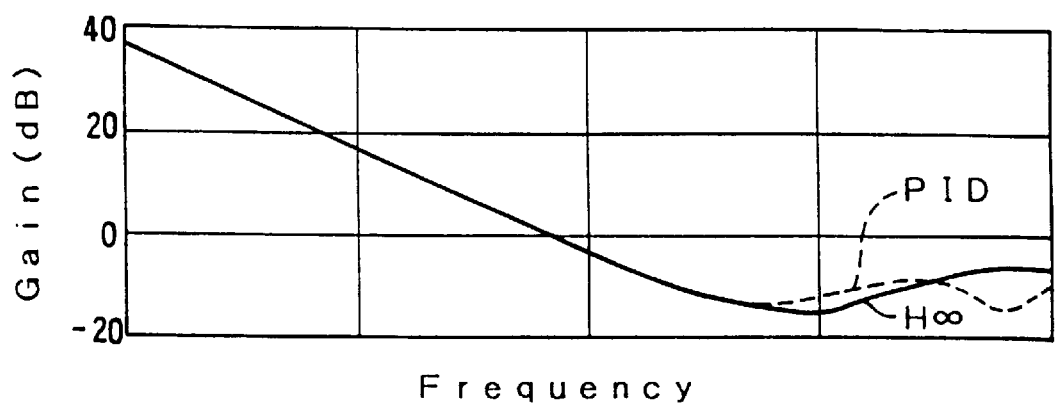
FIGS. 30A and 30B show comparison between the control characteristics of the slip control apparatus of the embodiment (R∞ controller) and those of the conventional PID controller.
Figure 30B:
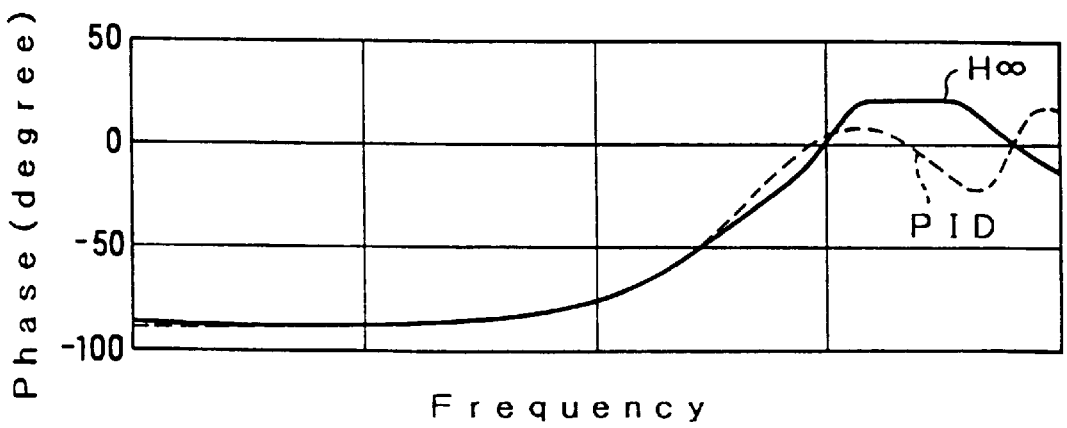

The H∞ controller discussed above has extremely preferable control characteristics, compared with the conventional PID controller. The control characteristics of the H∞ controller are given by the solid line in the graphs of FIGS. 30A and 30B. For the purpose of comparison, those of a conventional PID controller optimally adjusted to fulfill the required design conditions are given by the broken line.

Figure 31:
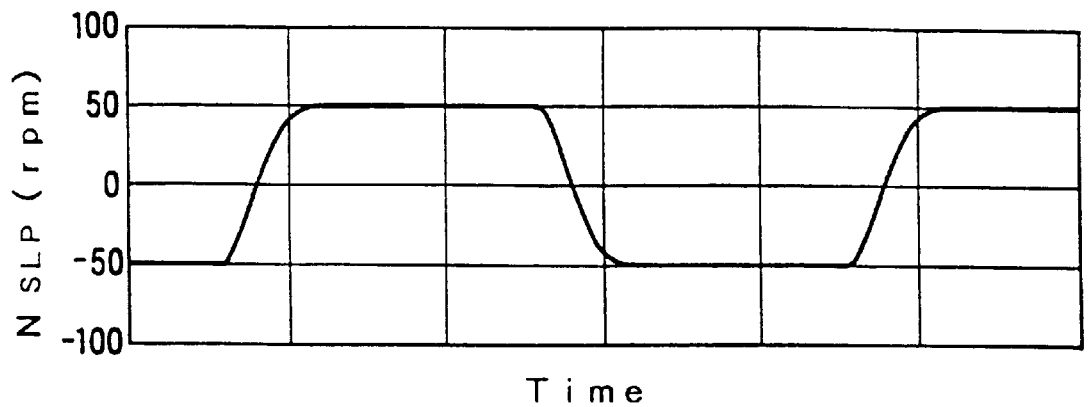
FIG. 31 is a graph showing a variation in slip revolution speed NSLP of a designed system.
Figure 32:
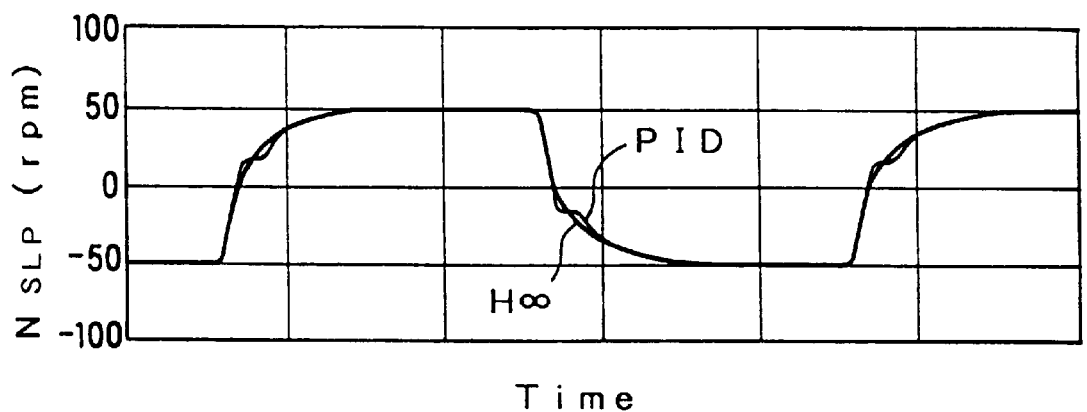
FIG. 32 shows variations in control characteristics of the actual slip revolution speed NSLP against the varied target slip revolution speed NSLP* in both the H∞ controller and the conventional PID controller.
Figure 33:
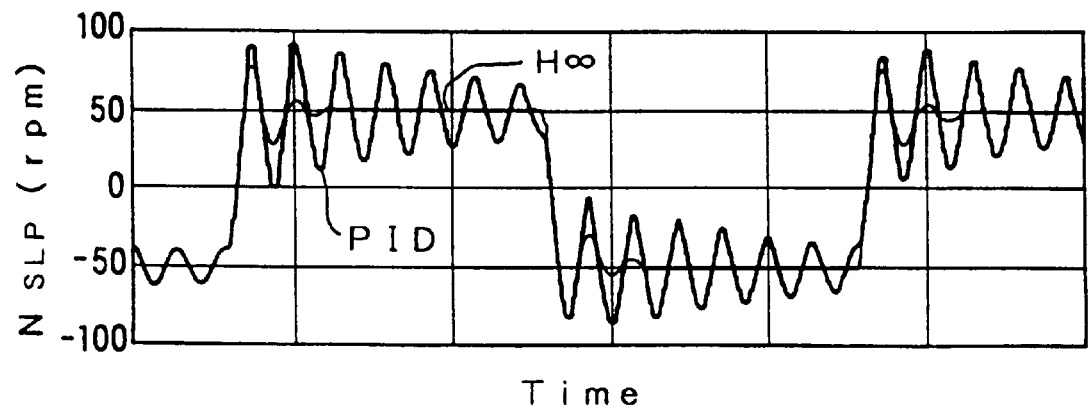
FIG. 33 is a graph showing response of the H controller and the conventional PID controller under the condition that the stationary gain of the control system is varied to a 2.5-fold.

The follow-up characteristics with a stepped variation in target slip revolution speed NSLP* are shown in FIGS. 31 through 33. FIG. 31 shows a variation in slip revolution speed NSLP at a design point, and FIG. 32 shows the performance (the actual slip revolution speed NSLP measured) of the H∞ controller and the PID controller at typical points of variation. The H∞ controller gives a smooth follow-up whereas the PID controller showing a fluctuation. FIG. 33 is a graph showing response of the H∞ controller and the conventional PID controller under the condition that the stationary gain of the control system is varied to a 2.5-fold at a point of variation due to deterioration of frictional members of the lock-up clutch 32 or operating oil. Referring to FIG. 33, while the H∞ controller guarantees sufficient stability with only a little fluctuation, the PID controller gives divergent characteristics.

The slip control apparatus of the first embodiment discussed above can guarantee sufficient stability and follow-up characteristics (response) over a characteristic perturbation of the control system due to deterioration of frictional members of the lock-up clutch 32 or operating oil. The method of manufacturing such a slip control apparatus according to the embodiment can realize the required control performance without repeating a time-consuming matching process or cut and error. This reduces the steps of design and adjustment process, thereby significantly saving the labor and cost required for development. Actual slip control of the clutch is carried out under a variety of driving conditions. When no sufficient convergence of control is obtained under a specific driving condition, the complementary sensitivity function T is evaluated under the specific driving condition. When the complementary sensitivity function T has a peak in a certain frequency domain, an increment is added to the weighting function W2 only in the certain frequency domain. This remarkably improves the convergence of transient response while minimizing the drop of response.

Figure 34:
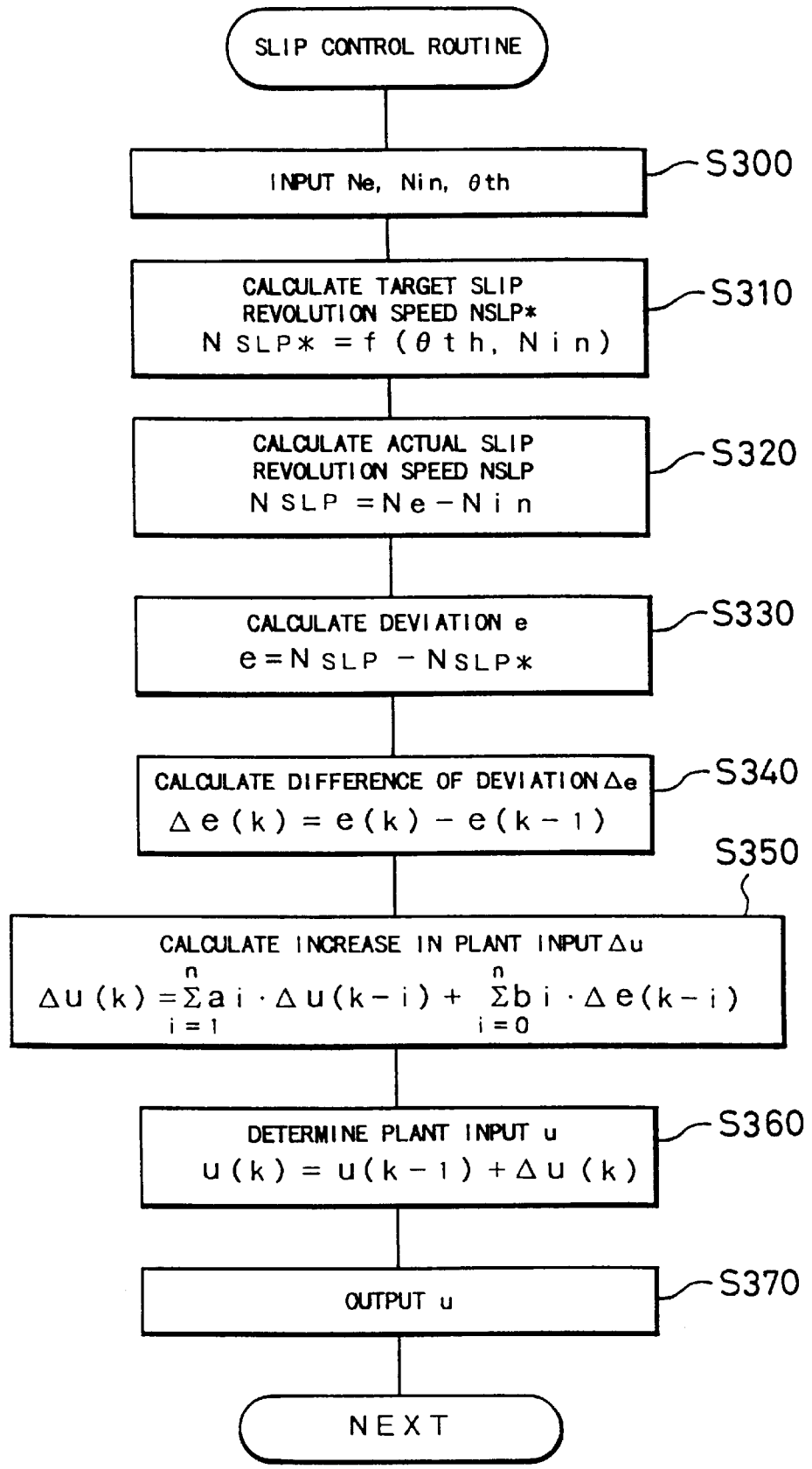
FIG. 34 is a flowchart showing a slip control routine executed in a second embodiment according to the present invention.

In the embodiment discussed above, the plant input u(k) is calculated from the input and output data at step S140 in every cycle of the slip control routine shown in FIG. 5. The plant input u(k) may, however, be calculated successively with an increase as shown in the flowchart of FIG. 34 given as a second embodiment of the present invention. The processing of steps S300 through S330 in the flowchart of is FIG. 34 is equivalent to that of steps S100 through S130 in the flowchart of FIG. 5. In the second embodiment, a difference 'Δe' in deviation 'e', is calculated at step S340 after the calculation of the deviation 'e' at step S330. The difference between a current deviation e(k) and a previous deviation e(k−1) is expressed as Δe. An increase Δu(k) of the plant input u(k) is then calculated at step S350, whereas the plant input u(k) or the driving current of the linear solenoid valve 52 is directly calculated at step S140 in the first embodiment. In accordance with a concrete procedure, the increase Δu(k) of the plant input u(k) is calculated according to the following equation:

$$\Delta u(k) = \sum_{i=1}^{n} ai \cdot \Delta u(k-i) + \sum_{i=0}^{n} bi \cdot \Delta e(k-i) \tag{22}$$

The program then proceeds to step S360, at which a current plant input u(k) is determined by adding the increase Δu(k) to a previous plant input u(k−1) determined in a previous cycle of the routine. At subsequent step S370, the current plant input u(k) thus determined is output.

In the structure of the second embodiment, the complementary sensitivity function T is evaluated at the time of designing the controller. When the complementary sensitivity function T has a peak under a specific driving condition, an increment is added to the weighting function W2 only in a corresponding frequency domain. The structure of the second embodiment exerts the same effects as those of the first embodiment and moreover requires a smaller memory for the operation since the operation at step S350 gives a small value as an increase of the plant input u(k).

The control apparatuses of the first and the second embodiments are designed to improve the stability of control over a characteristic perturbation of the plant with respect to the target slip revolution speed. A control apparatus of a third embodiment is, on the other hand, designed to eliminate a variation in slip revolution speed due to an external disturbance applied onto the plant as well as to realize the above object. The third embodiment has an augmented plant including frequency characteristics from a torque disturbance to a plant output (slip revolution speed), in order to eliminate a variation in slip revolution speed due to abrupt opening and closing of the throttle valve.

Figure 35:
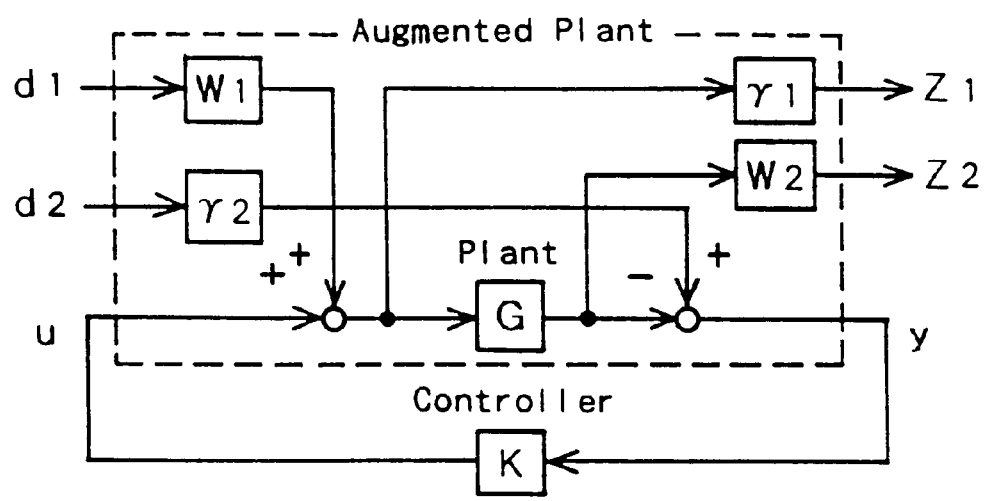
FIG. 35 is a block diagram illustrating an augmented control system in a third embodiment.

FIG. 35 is a block diagram showing the control system of the third embodiment, which corresponds to the block diagram of FIG. 17 in the first and the second embodiments (issue of mixed sensitivity). Referring to FIG. 35, W1 and W2 represent weighting functions like the first and the second embodiments, and γ1 and γ2 denote scalar weights. In the third embodiment, the sensitivity function S for defining the response is a transfer function from a first torque disturbance d1 to a first control quantity z1 to be evaluated while the complementary sensitivity function T for defining the stability is a transfer function from a second torque disturbance d2 to a second control quantity z2 to be evaluated. On the assumption that the torque disturbance is applied to the input of a plant G, a transfer function from the torque disturbance to the output can be expressed as a transfer from the first torque disturbance d1 to the second control quantity z2 to be evaluated. The transfer function from the torque disturbances d1 and d2 to the control quantities z1 and z2 to be evaluated are given by:

$$\begin{pmatrix} z1 \\ z2 \end{pmatrix} = \begin{pmatrix} \gamma 1 W1S & \gamma 1\gamma 2KS \\ W1W2GS & \gamma 2W2T \end{pmatrix} \begin{pmatrix} d1 \\ d2 \end{pmatrix} \tag{23}$$

Inequality (24) given below, which corresponds to Inequality (12b) of the first embodiment, is introduced as an evaluation index used for designing the controller:

$$\left\| \begin{matrix} \gamma 1 W1S & \gamma 1\gamma 2KS \\ W1W2GS & \gamma 2W2T \end{matrix} \right\|_{\infty} < 1 \tag{24}$$

The terms to be considered in Equation 23 are γ1W1S, γ1γ2KS, W1W2GS, and γ2W2T, where the term γ1γ2KS is required for solution of Equation 23. The structure of the third embodiment positively takes into account a variation in slip revolution speed against the torque disturbance d1, thus improving the suppression against the torque disturbance. Like the first and the second embodiments, the complementary sensitivity function T is evaluated and an increment is added to the weighting function W2 only in a specific frequency domain in the third embodiment. Although the torque disturbance is applied to the input of the plant in the structure of FIG. 35 as a matter of convenience, the control apparatus may be designed based on the precise modeling of the torque disturbance.

Although the foregoing invention has been described in some detail for purposes of clarity of understanding, it will be apparent that certain changes, alterations, and modifications may be practiced without departing from the scope and the spirit of essential characteristics of the present invention. Examples of possible modification include: a system for realizing a process equivalent to the operation of step S140 in the flowchart of FIG. 5 by combining a high-order low-pass filter with the conventional PID control; another system for approximating a characteristic perturbation by any of third-order through seventh-order functions and ninth and higher-order functions; and still another system for installing a specific multiplier for executing the operation of step S140. The scope of the invention is not limited to the specific embodiments given herein but is set forth in the appended claims.

What is claimed is:

1. In a feedback control system comprising detection means for measuring an actual state of a plant, determining a plant input used for controlling said plant to make said actual state of said plant coincide with a target state and adjusting said actual state of said plant based on said plant input, an improved control apparatus comprising:

memory means for storing a given constant, which is determined with a high-order weighting function approximating a perturbation of input-output frequency characteristics between said plant input and said actual state to satisfy required response and stability in a feedback control system for controlling said actual state of said plant;

means for correcting said given constant by adding a predetermined increment to said weighting function in a specific frequency domain when a complementary sensitivity function set for said plant has a peak in the specific frequency domain, so as to produce a corrected given constant stored in said memory means wherein said predetermined increment is a function restricted to a frequency range defining said peak;

first calculation means for deriving a first parameter using said corrected given constant stored in said memory means, said first parameter discretely reflecting past data of said plant input, which have been obtained in a current feedback control cycle and in previous cycles executed one to a preset number of times before;

second calculation means for deriving a second parameter using said corrected given constant stored in said memory means, said second parameter discretely reflecting past data of a deviation of said actual state from said target state, which have been obtained in a current feedback control cycle and in previous cycles executed one to a preset number of times before; and plant input determination means for determining a next plant input based on said first parameter and said second parameter respectively calculated by said first calculation means and said second calculation means.

2. A control apparatus in accordance with claim 1, wherein said first calculation means derive said first parameter reflecting at least five pieces of past data, and said second calculation means derive said second parameter reflecting at least five pieces of past data.

3. The control apparatus according to claim 1, wherein the predetermined increment is defined as a bell-shaped function.

4. The control apparatus according to claim 1, wherein:

the predetermined increment is defined as a bell-shaped function having a predetermined extent around a frequency at which said complementary sensitivity function has a peak;

the predetermined increment is given by $$K2 = \frac{s^2 + (a/c)s + d^2}{s^2 + (b/c)s + d^2}$$

where K2 is the predetermined increment, a, b, c and d are coefficients, and s is a variable characterizing said actual state of the plant; and said weighting function is corrected to produce a corrected weighting function W2S given by $W2S=Worg \times K2$, Worg being the weighting function.

5. A method for controlling a plant having a characteristic perturbation, comprising the steps of:

designing characteristics of a weighting function to satisfy a complementary relationship between a sensitivity function and a complementary sensitivity function; and when said complementary sensitivity function set for said plant has a peak in a specific frequency domain, adding a predetermined increment to said weighting function in said specific frequency domain wherein said predetermined increment is a function restricted to a frequency range defining said peak.

6. A slip control apparatus comprising slip revolution speed detection means for measuring an actual slip revolution speed of a clutch, said slip control apparatus determining a plant input supplied to said clutch to make said actual slip revolution speed of said clutch coincide with a target slip revolution speed and adjusting a slip condition of said clutch based on said plant input, said slip control apparatus further comprising:

memory means for storing a given constant, which is determined with a high-order weighting function approximating a perturbation of input-output frequency characteristics between said plant input and said actual slip revolution speed to satisfy required response and stability in a feedback control system for controlling said slip condition of said clutch;

means for correcting said given constant by adding a predetermined increment to said weighting function in a specific frequency domain when a complementary sensitivity function set for said feedback control system has a peak in said specific frequency domain, thereby to produce a corrected given constant stored in said memory means wherein said predetermined increment is a function restricted to a frequency range defining said peak;

first calculation means for deriving a first parameter using said corrected given constant stored in said memory means, said first parameter discretely reflecting past data of said plant input, which have been obtained in a current feedback control cycle and in previous cycles executed one to a preset number of times before;

second calculation means for deriving a second parameter using said corrected given constant stored in said memory means, said second parameter discretely reflecting past data of a deviation of said actual slip revolution speed from said target slip revolution speed, which have been obtained in a current feedback control cycle and in previous cycles executed one to a preset number of times before; and plant input determination means for determining a next plant input based on said first parameter and said second parameter respectively calculated by said first calculation means and said second calculation means.

7. A slip control apparatus in accordance with claim 6, wherein said first calculation means derive said first parameter reflecting at least five pieces of past data, and said second calculation means derive said second parameter reflecting at least five pieces of past data.

8. The slip control apparatus according to claim 6, wherein the predetermined increment is defined as a bell-shaped function.

9. The slip control apparatus according to claim 4, wherein:

the predetermined increment is defined as a bell-shaped function having a predetermined extent around a frequency at which said complementary sensitivity function has a peak;

the predetermined increment is given by $$K2 = \frac{s^2 + (a/c)s + d^2}{s^2 + (b/c)s + d^2},$$

where K2 is the predetermined increment, a, b, c and d are coefficients, and s is a variable characterizing said actual revolution speed of said clutch; and said weighting function is corrected to produce a corrected weighting function W2S given by $W2S=Worg \times K2$, Worg being the weighting function.

10. A method for controlling slip revolution speed by adjusting a plant input to a clutch to make an actual slip revolution speed of said clutch coincide with a target slip revolution speed and adjusting a slip condition of said clutch based on said plant input, said method further comprising the steps of:

measuring characteristic perturbations in a feedback control system for controlling said slip condition of said clutch according to a plurality of factors causing said characteristic perturbations;

approximating a comprehensive characteristic of said characteristic perturbations measured according to said plurality of factors by a first high-order weighting function;

evaluating a complementary sensitivity function and a sensitivity function as requisites for making said feedback control system stable with respect to said characteristic perturbations, said complementary sensitivity function being determined by taking into account said first weighting function and a first transfer function from said target slip revolution speed to said actual slip revolution speed, said sensitivity function being determined by taking into account a second transfer function from said target slip revolution speed to a deviation of control and a second weighting function set for ensuring a quick response;

adding a predetermined increment to said first weighting function in a specific frequency domain, when said complementary sensitivity function has a peak in said specific frequency domain, and prior to said evaluation wherein said predetermined increment is a function restricted to a frequency range defining said peak; and determining a constant used for deriving a control quantity of said feedback control system, based on said evaluation.

11. The control apparatus according to claim 10, wherein the predetermined increment is defined as a bell-shaped function.

12. The control apparatus according to claim 10, wherein:

the predetermined increment is defined as a bell-shaped function having a predetermined extent around a frequency at which said complementary sensitivity function has a peak;

the predetermined increment is given by $$K2 = \frac{s^2 + (a/c)s + d^2}{s^2 + (b/c)s + d^2},$$

where K2 is the predetermined increment, a, b, c and d are coefficients, and s is a variable characterizing said actual state of the plant; and said weighting function is corrected to produce a corrected weighting function W2S given by $W2S=Worg \times K2$, Worg being the weighting function.

13. A method for controlling slip revolution speed by adjusting a plant input to a clutch to make an actual slip revolution speed of said clutch coincide with a target slip revolution speed and adjusting a slip condition of said clutch based on said plant input, said method further comprising the steps of:

measuring characteristic perturbations in a feedback control system for controlling said slip condition of said clutch according to a plurality of factors causing said characteristic perturbations;

approximating a comprehensive characteristic of said characteristic perturbations measured according to said plurality of factors by a first high-order weighting function;

evaluating a complementary sensitivity function, a sensitivity function and a specific quantity as requisites for making said feedback control system stable with respect to said characteristic perturbations, said complementary sensitivity function being determined by taking into account said first weighting function and a first transfer function from said target slip revolution speed to said actual slip revolution speed, said sensitivity function being determined by taking into account a second transfer function from said target slip revolution speed to a deviation of control and a second weighting function set for ensuring a quick response, said specific quantity being determined by taking into account a third transfer function from a torque disturbance, which represents a variation in torque applied to said feedback control, to said actual slip revolution speed, an amount representing said first weighting function, said second weighting function set for ensuring a quick response, and said second transfer function from said target slip revolution speed to a deviation of control;

adding a predetermined increment to said first weighting function in a specific frequency domain, when said complementary sensitivity function has a peak in said specific frequency domain, prior to said evaluation wherein said predetermined increment is a function restricted to a frequency range defining said peak; and determining a constant used for deriving a control quantity of said feedback control system, based on said evaluation.

14. The apparatus according to claim 13, wherein the predetermined increment is defined as a bell-shaped function.

15. The method according to claim 13, wherein:

the predetermined increment is defined as a bell-shaped function having a predetermined extent around a frequency at which said complementary sensitivity function has a peak;

the predetermined increment is given by $$K2 = \frac{s^2 + (a/c)s + d^2}{s^2 + (b/c)s + d^2}$$

where K2 is the predetermined increment, a, b, c and d are coefficients, and s is a variable characterizing said actual revolution speed of said clutch; and said weighting function is corrected to produce a corrected weighting function W2S given by $W2S=Worg \times K2$, Worg being the weighting function.

16. In a feedback control system comprising detection means for measuring an actual state of a plant, determining a plant input used for controlling said plant to make said actual state of said plant coincide with a target state and adjusting said actual state of said plant based on said plant input, an improved control apparatus comprising:

memory means for storing a given constant, which is determined with a high-order weighting function approximating a perturbation of input-output frequency characteristics between said plant input and said actual state to satisfy required response and stability in a feedback control system for controlling said actual state of said plant;

means for correcting said given constant by adding a predetermined increment to said weighting function, wherein the predetermined increment is a function restricted to a frequency range defining a peak in a complementary sensitivity function set for said plant, so as to produce a corrected given constant stored in said memory means;

first calculation means for deriving a first parameter using said corrected given constant stored in said memory means, said first parameter discretely reflecting past data of said plant input, which have been obtained in a current feedback control cycle and in previous cycles executed one to a preset number of times before;

second calculation means for deriving a second parameter using said corrected given constant stored in said memory means, said second parameter discretely reflecting past data of a deviation of said actual state from said target state, which have been obtained in a current feedback control cycle and in previous cycles executed one to a preset number of times before; and plant input determination means for determining a next plant input based on said first parameter and said second parameter respectively calculated by said first calculation means and said second calculation means.

17. A method for controlling a plant having a characteristic perturbation, comprising the steps of:

designing characteristics of a weighting function to satisfy a complementary relationship between a sensitivity function and a complementary sensitivity function; and when said complementary sensitivity function set for said plant has a peak in a frequency domain, adding a predetermined increment to said weighting function, wherein the predetermined increment is a function restricted to a frequency range defining a peak in said complementary sensitivity function.

18. A slip control apparatus comprising slip revolution speed detection means for measuring an actual slip revolution speed of a clutch, said slip control apparatus determining a plant input supplied to said clutch to make said actual slip revolution speed of said clutch coincide with a target slip revolution speed and adjusting a slip condition of said clutch based on said plant input, said slip control apparatus further comprising:

memory means for storing a given constant, which is determined with a high-order weighting function approximating a perturbation of input-output frequency characteristics between said plant input and said actual slip revolution speed to satisfy required response and stability in a feedback control system for controlling said slip condition of said clutch;

means for correcting said given constant by adding a predetermined increment to said weighting function in a frequency domain, wherein the predetermined increment is a function restricted to a frequency range defining a peak in a complementary sensitivity function, thereby to produce a corrected given constant stored in said memory means;

first calculation means for deriving a first parameter using said corrected given constant stored in said memory means, said first parameter discretely reflecting past data of said plant input, which have been obtained in a current feedback control cycle and in previous cycles executed one to a preset number of times before;

second calculation means for deriving a second parameter using said corrected given constant stored in said memory means, said second parameter discretely reflecting past data of a deviation of said actual slip revolution speed from said target slip revolution speed, which have been obtained in a current feedback control cycle and in previous cycles executed one to a preset number of times before; and plant input determination means for determining a next plant input based on said first parameter and said second parameter respectively calculated by said first calculation means and said second calculation means.

19. A method for controlling slip revolution speed by adjusting a plant input to a clutch to make an actual slip revolution speed of said clutch coincide with a target slip revolution speed and adjusting a slip condition of said clutch based on said plant input, said method further comprising the steps of:

measuring characteristic perturbations in a feedback control system for controlling said slip condition of said clutch according to a plurality of factors causing said characteristic perturbations;

approximating a comprehensive characteristic of said characteristic perturbations measured according to said plurality of factors by a first high-order weighting function;

evaluating a complementary sensitivity function and a sensitivity function as requisites for making said feedback control system stable with respect to said characteristic perturbations, said complementary sensitivity function being determined by taking into account said first weighting function and a first transfer function from said target slip revolution speed to said actual slip revolution speed, said sensitivity function being determined by taking into account a second transfer function from said target slip revolution speed to a deviation of control and a second weighting function set for ensuring a quick response;

adding a predetermined increment to said first weighting function, wherein the predetermined increment is a function restricted to a frequency range defining a peak in the complementary sensitivity function, prior to said evaluation; and determining a constant used for deriving a control quantity of said feedback control system, based on said evaluation.

20. A method for controlling slip revolution speed by adjusting a plant input to a clutch to make an actual slip revolution speed of said clutch coincide with a target slip revolution speed and adjusting a slip condition of said clutch based on said plant input, said method further comprising the steps of:

measuring characteristic perturbations in a feedback control system for controlling said slip condition of said clutch according to a plurality of factors causing said characteristic perturbations;

approximating a comprehensive characteristic of said characteristic perturbations measured according to said plurality of factors by a first high-order weighting function;

evaluating a complementary sensitivity function, a sensitivity function and a specific quantity as requisites for making said feedback control system stable with respect to said characteristic perturbations, said complementary sensitivity function being determined by taking into account said first weighting function and a first transfer function from said target slip revolution speed to said actual slip revolution speed, said sensitivity function being determined by taking into account a second transfer function from said target slip revolution speed to a deviation of control and a second weighting function set for ensuring a quick response, said specific quantity being determined by taking into account a third transfer function from a torque disturbance, which represents a variation in torque applied to said feedback control, to said actual slip revolution speed, an amount representing said first weighting function, said second weighting function set for ensuring a quick response, and said second transfer function from said target slip revolution speed to a deviation of control;

adding a predetermined increment to said first weighting function wherein the predetermined increment is a function restricted to a frequency range defining a peak in said complementary sensitivity function, prior to said evaluation; and determining a constant used for deriving a control quantity of said feedback control system, based on said evaluation.

* * * * *